(12) United States Patent
Onaka

(10) Patent No.: US 8,452,193 B2
(45) Date of Patent: May 28, 2013

(54) OPTICAL RECEIVER

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 424 days.

(21) Appl. No.: 12/640,381

(22) Filed: Dec. 17, 2009

(65) Prior Publication Data

US 2010/0166425 A1     Jul. 1, 2010

(30) Foreign Application Priority Data

Dec. 26, 2008   (JP) .................. 2008-333383

(51) Int. Cl.
*H04B 10/06*    (2006.01)
(52) U.S. Cl.
USPC ........................................ 398/212
(58) Field of Classification Search
USPC ................................. 398/202, 212–213
See application file for complete search history.

(56) References Cited

U.S. PATENT DOCUMENTS

| | | | |
|---|---|---|---|
| 5,422,968 A | 6/1995 | Hanatani et al. | |
| 5,699,378 A | 12/1997 | Lealman et al. | |
| 5,717,510 A | 2/1998 | Ishikawa et al. | |
| 5,963,362 A | 10/1999 | Fukaishi | |
| 2002/0048062 A1 | 4/2002 | Sakamoto et al. | |
| 2006/0024063 A1 | 2/2006 | Onaka et al. | |

FOREIGN PATENT DOCUMENTS

| | | |
|---|---|---|
| JP | 6-258545 | 9/1994 |
| JP | 7-226727 | 8/1995 |
| JP | 8-321805 | 12/1996 |
| JP | 10-209543 | 8/1998 |
| JP | 2000-510602 | 8/2000 |
| JP | 2002-57624 | 2/2002 |
| JP | 2004-179799 | 6/2004 |
| JP | 2006-49405 | 2/2006 |

OTHER PUBLICATIONS

Japanese Patent Office Notification of Reasons for Refusal dated Nov. 13, 2012 for corresponding Japanese Patent Application No. 2008-333383.

*Primary Examiner* — Leslie Pascal
(74) *Attorney, Agent, or Firm* — Staas & Halsey LLP

(57) ABSTRACT

An optical receiver for receiving a wavelength channel signal light separated out of a wavelength division multiplexed signal light including a plurality of wavelength channel signal lights, the optical receiver includes an optical amplifier for amplifying the wavelength channel signal light, a cyclic filter having a transmission wavelength characteristic of periodically changing transmittance property for a wavelength interval between a wavelength of an adjacent wavelength channel signal light and a wavelength of the wavelength diversion multiplexed signal light, the cyclic filter passing the wavelength channel signal light amplified by the optical amplifier, and a demodulator operably connected to the cyclic filter for demodulating the wavelength channel signal light output from the cyclic filter into an electrical signal.

18 Claims, 21 Drawing Sheets

FIG. 3
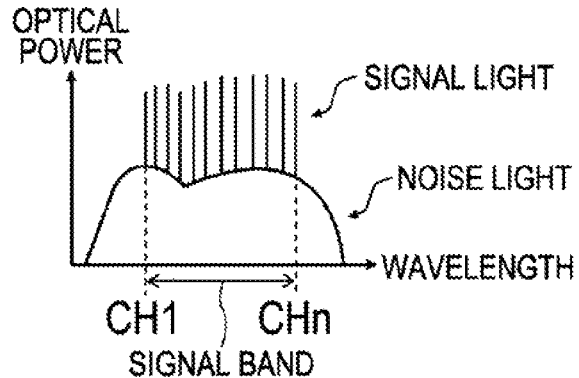
OUTPUT SPECTRUM OF OPTICAL AMPLIFIER FOR WDM
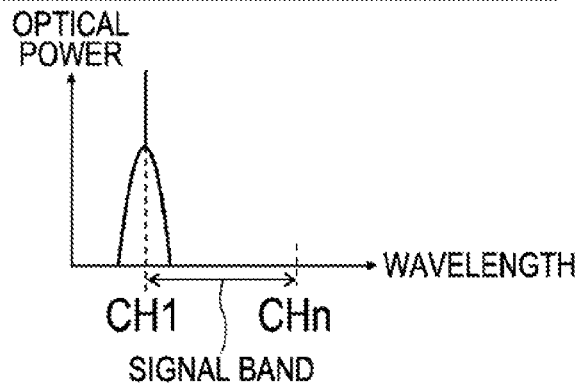
OUTPUT SPECTRUM OF DEMULTIPLEXER (CH1)
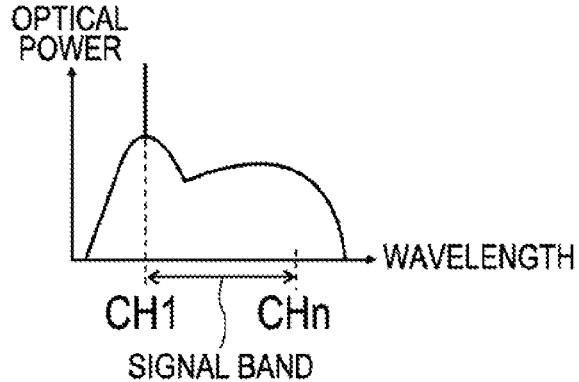
OUTPUT SPECTRUM OF OPTICAL AMPLIFIER FOR SINGLE WAVELENGTH

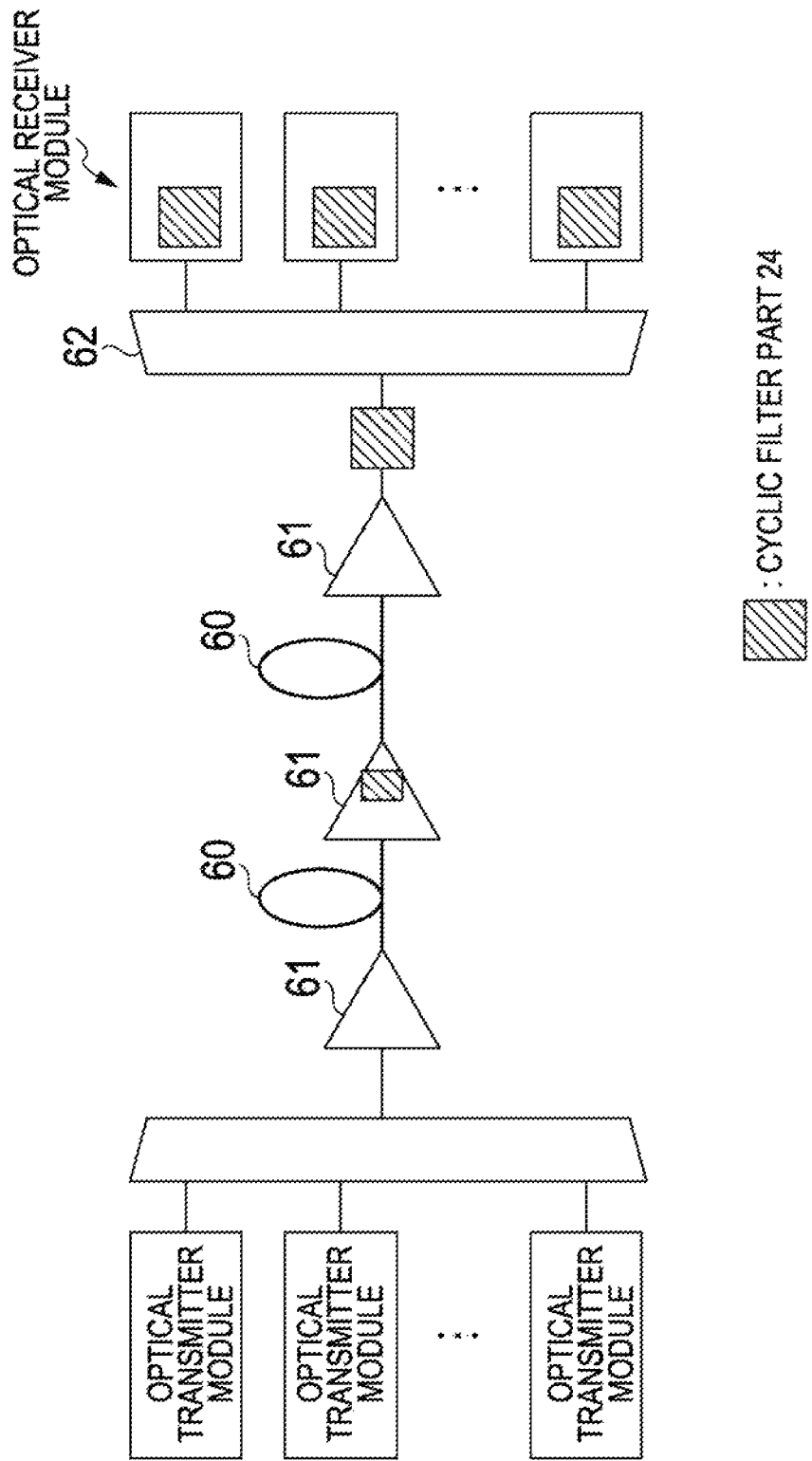

US 8,452,193 B2

OPTICAL RECEIVER

CROSS-REFERENCE TO RELATED APPLICATION

This application is based upon and claims the benefit of priority of the prior Japanese Patent Application No. 2008-333383 filed on Dec. 26, 2008, the entire contents of which are incorporated herein by reference.

FIELD

An aspect of the embodiments discussed herein is directed to an optical receiver.

BACKGROUND

When signal light is transmitted in an optical communication system at a high speed of not less than 40 Gb/s, an optical pulse width of a transmitted signal is narrowed to be several picoseconds. Accordingly, waveform distortion caused by minimal chromatic dispersion or polarization-mode dispersion of an optical fiber significantly deteriorates transmission properties. Further, it has been known that a dispersion value of a transmission fiber is time-varied with a change in the temperature and environment and the minimal change affects the transmission properties.

FIG. 1 is a diagram illustrating an optical receiver in a WDM transmission system in the related art using a technique of chromatic dispersion compensation or a polarization mode dispersion compensation. As illustrated in FIG. 1, an optical receiver 100 includes an optical preamplifier 101 that collectively amplifies WDM light and a demultiplexer 102 that demultiplexes the light into light of each wavelength. Signal light CH1, CH2, . . . , or CHn of each wavelength output from the demultiplexer 102 is supplied to a corresponding optical receiver module 103_1, 103_2, . . . , or 103_n, where reception processing is performed. A function component 111 such as a tunable dispersion compensator (TDC), a polarization-mode dispersion compensator (PMDC), or the like is provided on the optical path in each of the optical receiver modules 103_1 to 103_n to execute a preferable dispersion compensation with respect to the signal light received by each function component 111.

In the case where the function component 111 such as TDC, PMDC, or the like is used, when the power level of the received light becomes low owing to optical loss in the function component 111, a bit error rate (BER) increases in a demodulator 112 and an identification reproducer 113. In order to suppress the increase in BER, it is necessary for each of the optical receiver modules 103_1 to 103_n corresponding to the respective wavelengths to have a function for compensating the optical loss in the function component 111 by providing an optical amplifier 114 between the function component 111 and the demodulator 112. However, when using the optical amplifier 114, there is a possibility that the waveform of the received light is deteriorated owing to noise light such as amplified spontaneous emission (ASE) generated when the optical amplifier 114 amplifies the signal light.

Further, waveforms of the received light may be deteriorated not only by the influence of noise light in the optical amplifier 114, but also by the increase in the width of each optical spectrum when transmitting each signal light at a high speed. Specifically, for example, as illustrated in FIG. 2, when a bit rate of each signal light included in WDM light is increased from 10 Gb/s to 40 Gb/s, the spectrum width of each signal light is increased about four times. At that time, when a distance between channels of the WDM light is narrowly set (50 GHz in the example illustrated in the drawing), there is a possibility that bottom areas of optical spectrums of adjacent channels are overlapped to each other and a cross talk may occur between the channels.

That is, when the optical spectrum width is increased with the increase in the speed of modulating each signal light included in the WDM light, unnecessary light (overlapped components of the optical spectrums) that deteriorates reception properties of each signal is relatively increased.

Herein, since it is desirable to increase the transmission properties without respect to the noise light generated in the optical amplifier 114, a difference between a WDM optical amplifier that collectively amplifies multiple wavelengths, and a single wavelength optical amplifier that amplifies a single wavelength will be described. The WDM transmission system includes a large number of optical amplifiers for WDM (for example, the optical preamplifier 101 in FIG. 1, and the like) that collectively amplify multiple wavelengths on the optical path through which the WDM light propagates, in addition to the optical amplifier for a single wavelength arranged preceding the receiver corresponding to each wavelength. As illustrated in FIG. 3, noise light (see upper part of FIG. 3) such as ASE generated in the optical amplifier for WDM passes the demultiplexer 102 of the optical receiver 100, so that only the noise component exists in the band of each signal light is transmitted through the demultiplexer 102 and supplied to the demodulator 112 corresponding to each signal wavelength, and the noise component exists outside the band is blocked by the demultiplexer 102 (see middle part of FIG. 3). Consequently, the noise light generated in the optical amplifier for WDM does not affect much the reception properties of the signal light of each wavelength, and may be ignored in many cases.

On the contrary, since the optical amplifier 114 for a single wavelength is provided on the optical path through which signal light of each wavelength demultiplexed by the demultiplexer 102 propagates, noise light generated over a wide wavelength band in the optical amplifier 114 is directly input to the demodulator 112 (see lower part of FIG. 3). Accordingly, the ratio of power of the signal light of a single wavelength to the total power of the noise light becomes small, causing the reception properties to deteriorate.

Prior arts related to the present technique include technologies disclosed in the following patent documents. Japanese Laid-open Patent Publication No. 08-321805 discusses a technique that an optical transmission system has a characteristic adjustment device for adjusting a characteristic value of the optical signal. Japanese Laid-open Patent Publication No. 2004-179799 discusses a technique that an optical receiver has an optical filtering device for restricting the band of each channel signal light.

SUMMARY

An optical receiver for receiving a wavelength channel signal light separated out of a wavelength division multiplexed signal light including a plurality of wavelength channel signal lights, the optical receiver includes an optical amplifier for amplifying the wavelength channel signal light, a cyclic filter having a transmission wavelength characteristic of periodically changing transmittance property for a wavelength interval between a wavelength of an adjacent wavelength channel signal light and a wavelength of the wavelength diversion multiplexed signal light, the cyclic filter passing the wavelength channel signal light amplified by the optical amplifier, and a demodulator operably connected to the cyclic filter for demodulating the wavelength channel signal light output from the cyclic filter into an electrical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating noise light included in light input in a receiver;

FIG. 21 is a diagram illustrating an example of a WDM transmission system in which a cyclic filter part is provided.

DESCRIPTION OF EMBODIMENTS

Figure 4:
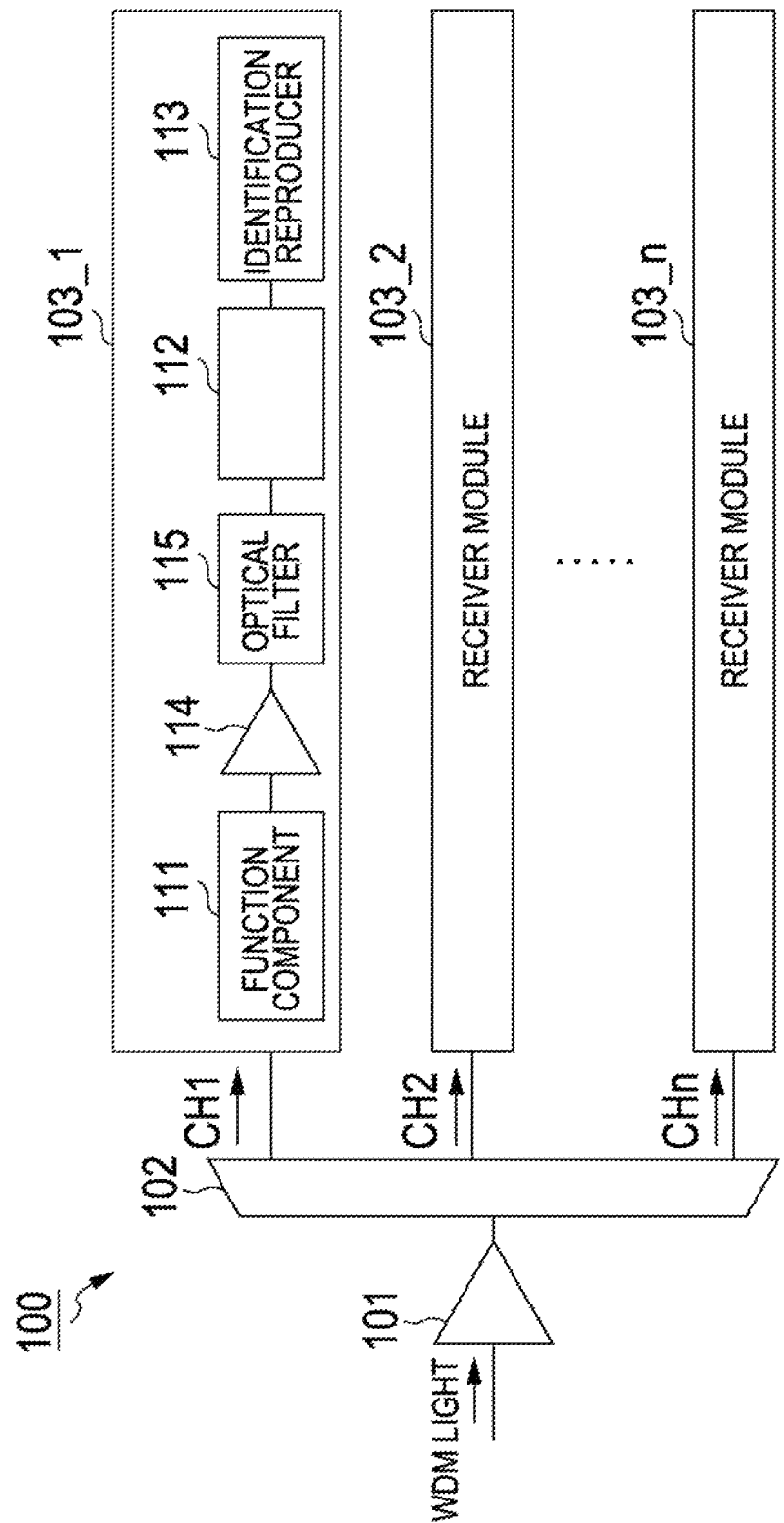
FIG. 4 is a diagram illustrating an example of the structure of the related art by which noise light generated in an optical amplifier for a single wavelength is removed by using an optical filter.

As described previously, a technique has been disclosed in related art for reducing the light that may deteriorate the reception properties such as the noise light generated in the optical amplifier for a single wavelength, the additional light generated by the increase in the optical spectrum width along with the increase in the transmission speed of signal light, or the like. For example, as illustrated in FIG. 4, an optical filter 115 is provided on the optical path between the optical amplifier 114 and the demodulator 112, and the optical filter 115 removes light outside the band of the signal light to be received in a structure. The optical filter 115 uses a passive optical filter in which a transmission wavelength characteristic is fixed or a variable active optical filter as for the structure of the related art using the optical filter 115 illustrated in FIG. 4, there are following problems as for effects of removing unnecessary light, and cost, size, and operability of the optical receiver.

Figure 5:
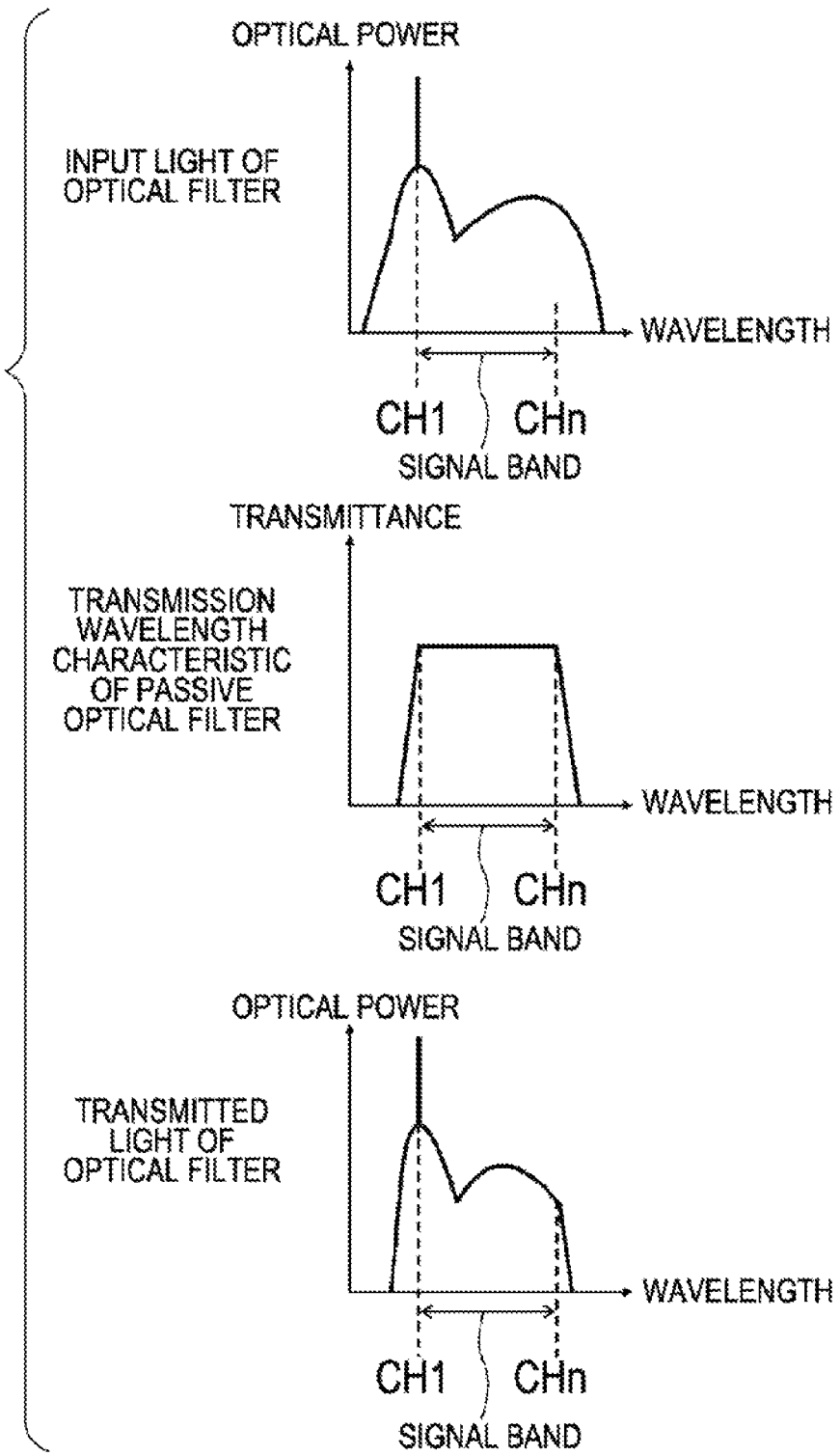
FIG. 5 is a diagram illustrating an example of an optical spectrum when a passive optical filter is used in the exemplary structure of FIG. 4.

First, a problem in the case where a passive optical filter is used for the optical filter 115 in the structure of the related art will be described with reference to an example of optical spectrum illustrated in FIG. 5. In the example of FIG. 5, the transmission band of the passive optical filter is set to be approximately the same as the wavelength band in which a plurality of signal lights included in the WDM light to be received by the optical receiver 100 are arranged (hereinafter, referred to as signal band of WDM light). Unnecessary light outside the signal band of the WDM light is removed by supplying light output from the optical amplifier 114 for a single wavelength to the passive optical filter.

The structure using the passive optical filter has an advantage in that common passive filters may be used for the optical receiver modules 103_1 to 103_n corresponding to the wavelengths of the WDM light. However, removal of unnecessary light is not executed individually corresponding to each of the reception wavelengths, so that unnecessary light remains in the signal band of the WDM light. Accordingly, there is a disadvantage that it is difficult to sufficiently improve the reception properties. When the passive optical filter is made to have a narrow band such that only the light corresponding to each reception wavelength is transmitted, an improvement of the reception properties is increased. However, in this case, it is necessary to individually design the optical filter 115 applied to each of the optical receiver modules 103_1 to 103_n, and each of the reception wavelengths is fixed. Consequently, it becomes difficult to cope with change in the reception wavelength due to, for example, switching of the optical path, or the like, and this causes a problem when managing the optical receiver.

Figure 6:
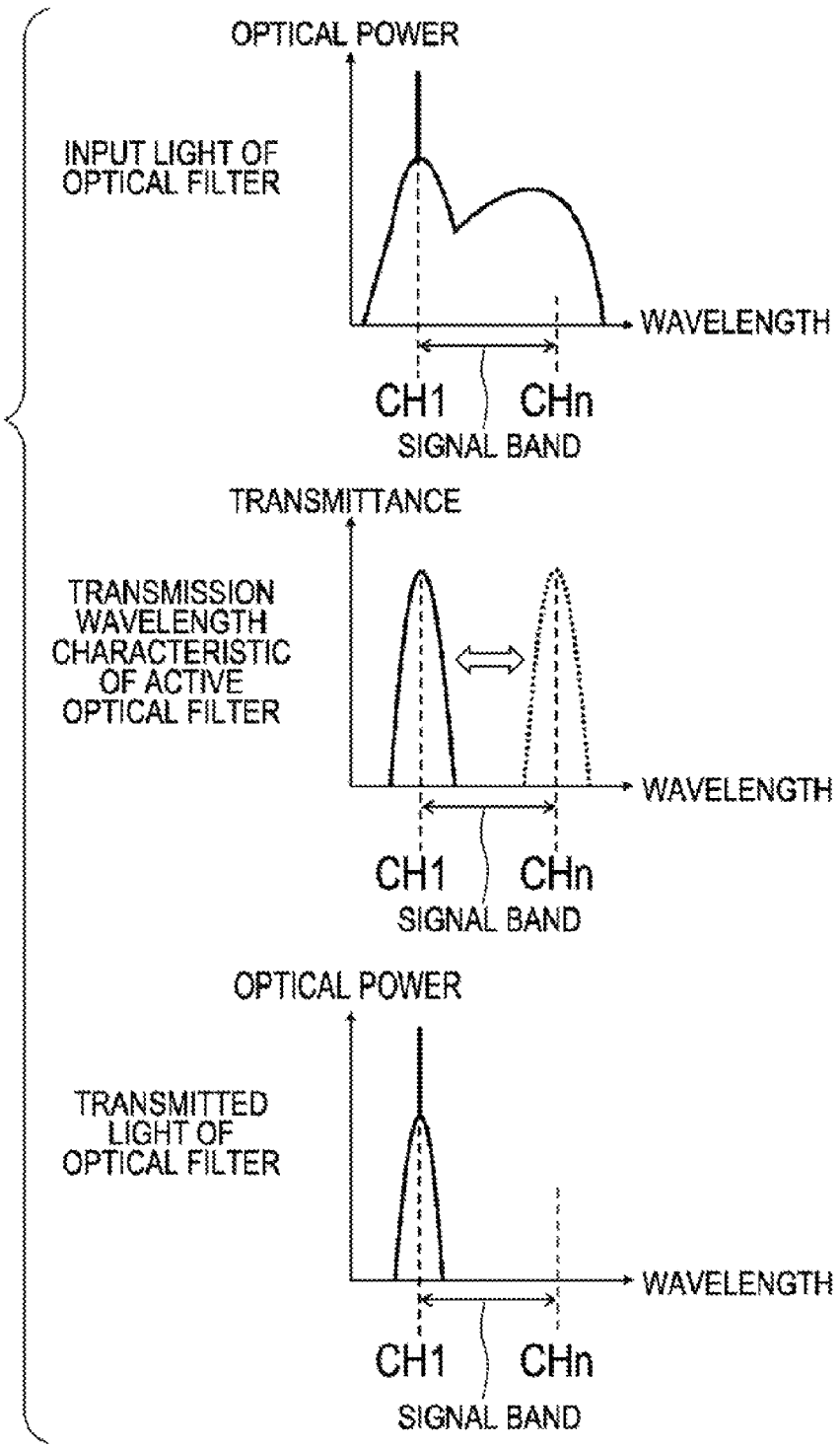
FIG. 6 is a diagram illustrating an example of an optical spectrum when an active optical filter is used in the exemplary structure of FIG. 4.

As for the problem when using the passive optical filter, it is efficient to use an active optical filter having a variable transmission wavelength characteristic. FIG. 6 illustrates an example of an optical spectrum when using an active optical filter. The transmission band of the active optical filter is varied in a wavelength range including the signal band of the WDM light received by the optical receiver 100, and the transmission band is controlled such that the center wavelength of the transmission band coincides with the reception wavelength of the optical receiver module to which the active optical filter is applied. However, the active optical filter is expensive as compared with the passive optical filter, and the number of active optical filters to be set is also increased as the number of wavelengths of the WDM light increases. Accordingly, the cost of the entire optical receiver is considerably increased. Further, a control mechanism for optimizing the transmission band of the active optical filter is necessary, and the structure of each optical receiver module becomes complicated so that it is not easy to ensure the mounting space in the optical receiver.

The technique is made in the light of the above-mentioned circumstances, and the object is to provide an optical receiver and a WDM transmission system that may efficiently reduce unnecessary light that deteriorates reception properties of high-speed WDM light by a simple structure, that may be easily managed, and that may reduce costs.

Hereinafter, embodiments will be described in detail with reference to the accompanying drawings.

Figure 7:
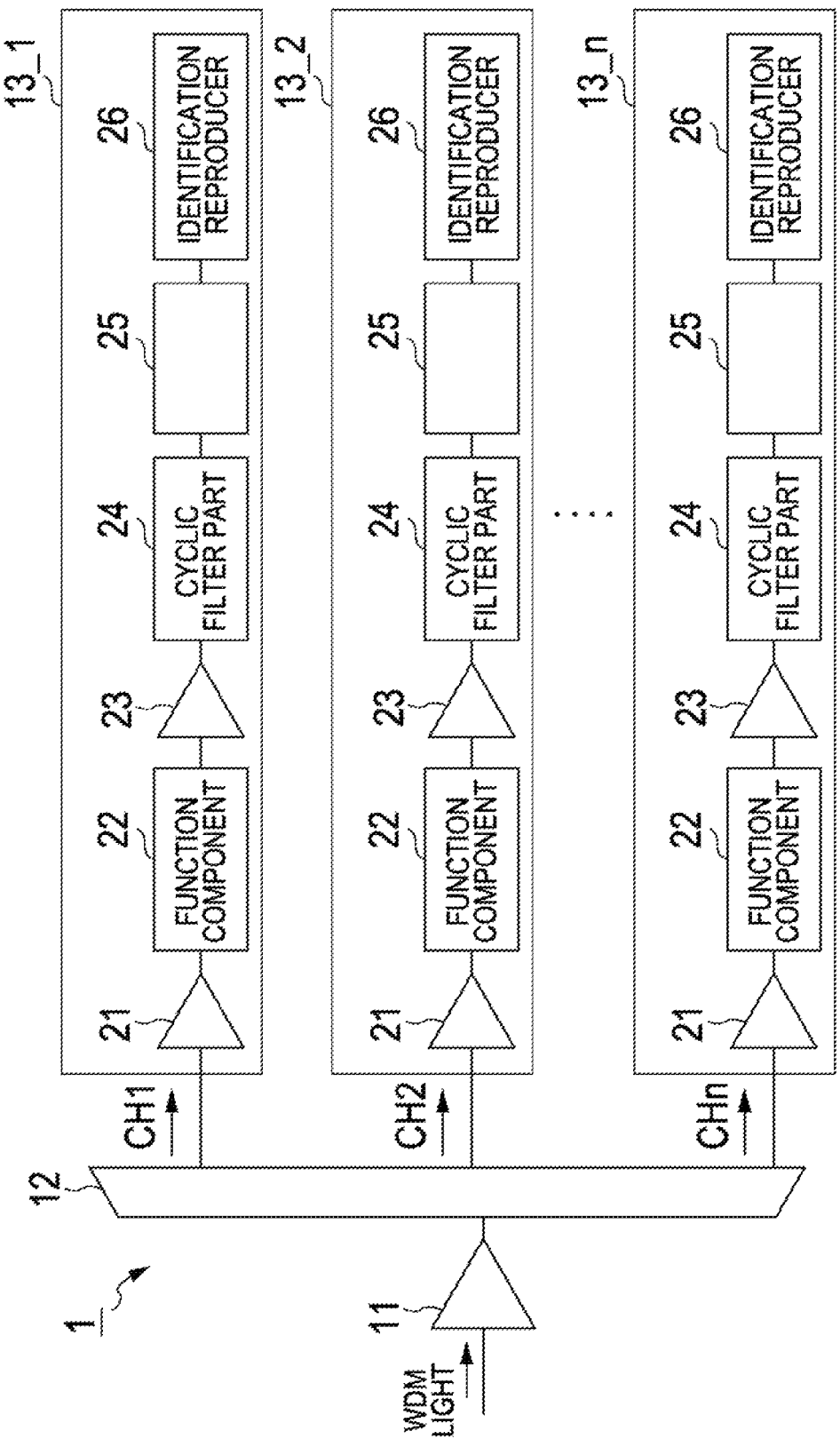
FIG. 7 is a block diagram illustrating the structure of the optical receiver according to the first embodiment.

FIG. 7 is a block diagram illustrating the structure of an optical receiver according to a first embodiment.

In FIG. 7, the optical receiver 1 is equipped with, for example, an optical preamplifier 11, a demultiplexer 12, and a plurality of optical receiver modules 13_1 to 13_n.

The optical preamplifier 11 is connected to an optical transmission path of a WDM transmission system (not illustrated) using the optical receiver 1. WDM light that have been transmitted through the optical transmission pathway is input in the optical amplifier 11. The WDM light includes a plurality of signal lights (channels) CH1, CH2, ... CHn having different wavelengths, and each channel CH1, CH2, ..., CHn is collectively amplified to a predetermined level by the optical preamplifier 11. The structure of the optical preamplifier 11 is the same as the structure of a known WDM optical amplifier. Note that the number of wavelengths (the number of channels) of the WDM light input in the optical receiver 1 shall be n herein.

The collectively amplified WDM light by the optical preamplifier 11 is provided to an input port of the demultiplexer 12, and the demultiplexer 12 demultiplexes the WDM light for every wavelength. The demultiplexed each channel CH1 to CHn is respectively output from the corresponding output port of the demultiplexer 12. Optical receiver modules 13_1 to 13n are respectively connected to each output port of the demultiplexer 12.

Each optical receiver module 13_1 to 13_n respectively includes, for example, a pre-stage optical amplification part 21 and a post-stage optical amplification part 23 connected in series, a function component 22 disposed between the stages of the optical amplification parts 21, 23 of the two-stage structure, a cyclic filter part 24 connected to an output terminal of the post-stage optical amplifier 23, a demodulator 25 to which transmission light of the cyclic filter part 24 is provided, and an identification reproducer 26 connected to an output terminal of the demodulator 25.

The pre-state and post-stage optical amplification parts 21, 23 amplifies signal light of a single wavelength demultiplexed by the demultiplexer 12 to a predetermined level. A known optical amplifier such as, for example, a rare earth added fiber amplifier using an optical fiber in which rare earth such as erbium as an amplification medium, a semiconductor optical amplifier, a lumped Raman amplifier in which a non-linear fiber is an amplification medium.

The function component 22 includes a chromatic dispersion compensator, a polarization mode dispersion compensator, or the like, and signal light amplified by the pre-stage optical amplifier 21 is provided to the function component 22. Signal deterioration occurred in the optical transmission path is compensated by executing a chromatic dispersion compensation or a polarization mode dispersion compensation to the signal light. The function component 22 has an inherent optical loss, and the optical loss is compensated by the post-stage optical amplification part 23. Signal light constantly controlled to have a desired level is output from the post-stage optical amplification part 23.

Note that, an example in which a compensation of optical loss of the function component 22 is executed by the optical amplification parts of the two stage structure is illustrated. However, optical loss of the function component 22 may be compensated by the optical amplifier (see FIG. 4) of one stage structure in which the pre-stage optical amplifier is omitted. Further, it is also possible to constitute a multi-stage amplification structure of not less than three stages although not specifically illustrated in the drawing. Further, the arrangement of the function component 22 is not limited to the aforementioned example, and the function component 22 may be arranged at any position on the optical path of a pre-stage of the demodulator 25.

The cyclic filter part 24 is arranged on the optical path at the input side of the demodulator 25 such that unnecessary light is not input in the demodulator 25. It is preferable that the cyclic filter part 24 is arranged on the optical path at the output side of the post-stage optical amplification part 23 (output side of the final stage when the optical amplification part is constituted by not less than three stages). The cyclic filter part 24 has a transmission wavelength characteristic in which transmittance is cyclically changed to correspond with a wavelength distance (channel distance) of each signal light included in the WDM light received by the optical receiver 1. The cyclical transmission wavelength characteristic is basically fixed, and is designed so that each peak wavelength in which transmittance becomes the maximum is approximately matched with the center wavelength of each channel of the WDM light. Further, the full width at half maximum of the transmission band in which each wavelength is the center is set wider than the wavelength width determined based on a shift amount of the center wavelength of each channel, and narrower than the channel distance of the WDM light.

Figure 1:
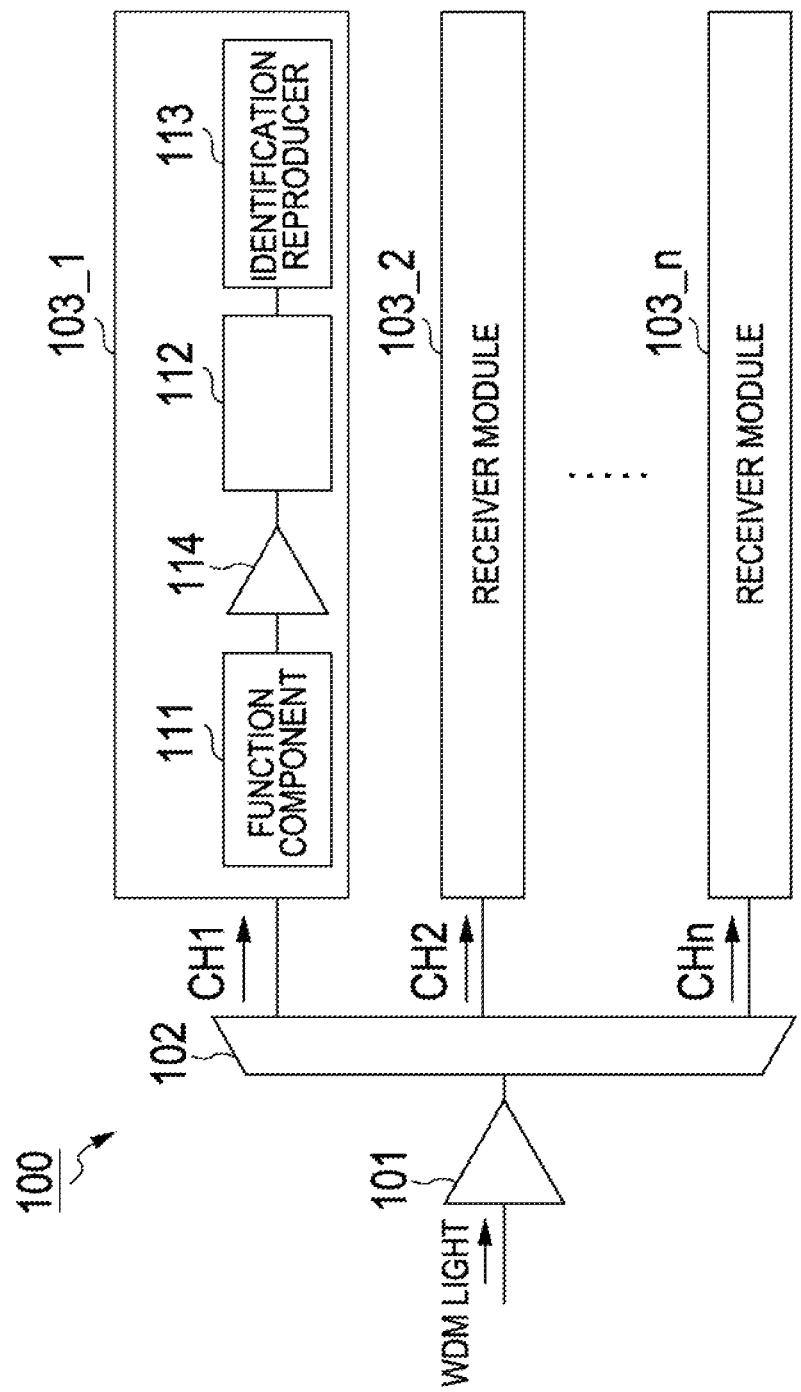
FIG. 1 is a block diagram illustrating an example of the structure of an optical receiver of a WDM transmission system of the related art.
Figure 2:
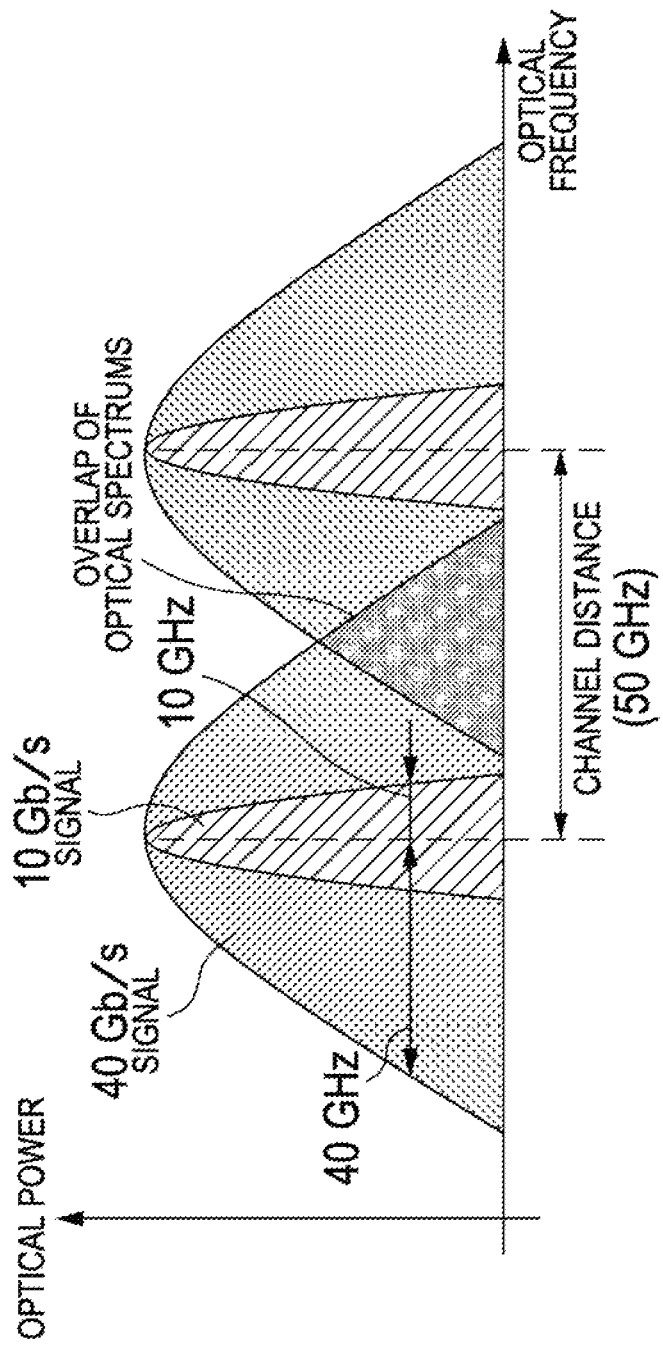
FIG. 2 is a diagram illustrating a change of signal spectrums by speeding up of signal light.
Figure 8:
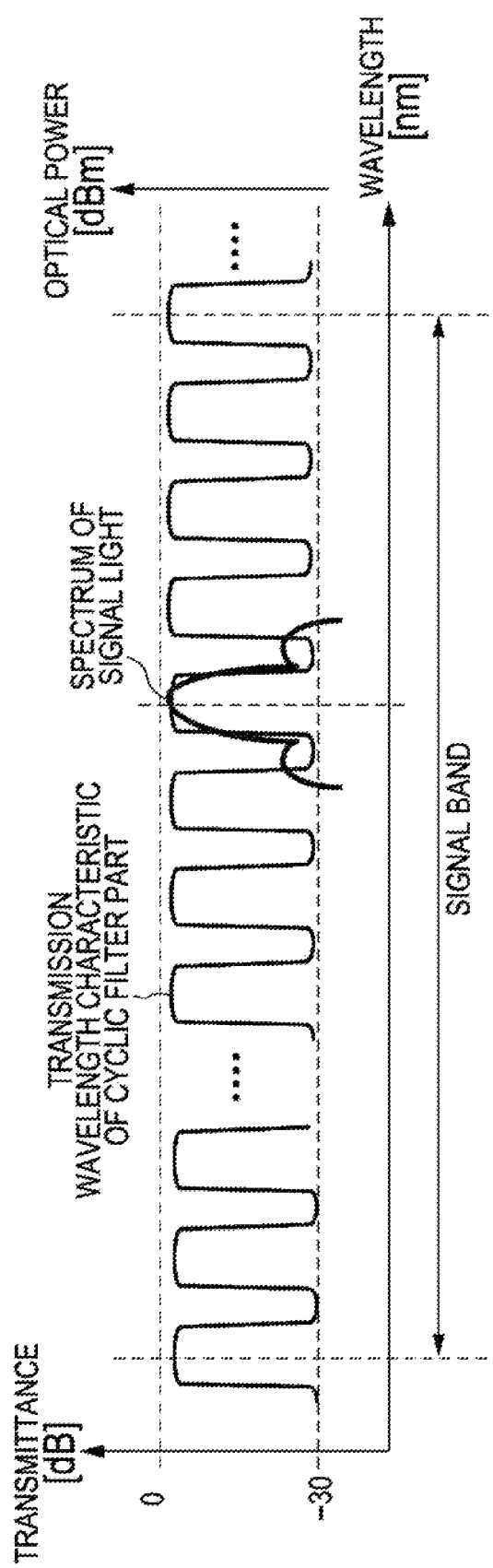
FIG. 8 is a diagram illustrating an example of a transmission wavelength characteristic of a cyclic filter part in the first embodiment.

FIG. 8 is a diagram illustrating an example of the transmission wavelength characteristic of the cyclic filter part 24. In FIG. 8, the thick line in a signal band indicates a spectrum of signal light of a single wavelength. The center wavelength of the signal light corresponds to a wavelength grid regulated by ITU or the like, and the center spectrum component is in the corresponding transmission band of the cyclic filter part 24. On the other hand, side wave band components at the short wavelength side and the long wavelength side of the signal light (corresponding to extra light that deteriorates the reception property illustrated in FIG. 2) exist in valleys of adjacent transmission bands of the cyclic filter part 24, and removed by the cyclic filter part 24. Further, noise light generated in the pre-stage and post-stage optical amplifier parts 21, 23 is distributed in a wide range over the entire signal band and outside the signal band of the WDM light although not specifically illustrated in the drawings herein. The component positioned between the valleys of each transmission band of the cyclic filter part 24 is removed by the cyclic filter part 24.

As an optical filter having the cyclic transmission wavelength characteristic, there is an optical filter generally called as an interleaver using a diffraction phenomenon of light such as, for example, a fiber Bragg grating (FBG), a fused coupler, a planner lightwave circuit (PCL), or the like. Specifically, the structure using a PLC of a Mach-Zehnder type is disclosed in, for example, Japanese Laid-open Patent Publication No. 2003-35830, and it is possible to provide the interleaver by applying the structure. Further, the cyclic transmission wavelength characteristic may be provided also by an optical filter using a Fabry-Perot interferometer. In the Fabry-Perot interferometer, transmittance is cyclically changed in accordance with the distance between a pair of parallel reflection faces, and the width of the transmission band cyclically repeated is changed in accordance with the reflectance of each reflection face. Note that the cycle of the transmission wavelength characteristic of the cyclic filter part 24 and the width of each transmission band will be described below in detail with a concrete example.

The signal light transmitted through the cyclic filter part 24 is received by the demodulator 25. The demodulator 25 generates an electric signal by demodulating the signal light and outputs to the identification reproducer 26. The identification reproducer 26 executes a well known processing for identifying and regenerating the received data by using the output signal of the demodulator 25.

Next, an operation of the first embodiment will be described.

In the optical receiver 1 having the structure, the WDM light transmitted through an optical transmission path is collectively amplified by the optical preamplifier 11, and then, demultiplexed into each channel CH1 to CHn by the demultiplexer 12, and respectively transmitted to each optical receiver module 13_1 to 13_n. In each optical receiver module 13_1 to 13_n, each channel (signal light of a single wavelength) transmitted from the demultiplexer 12 is provided to the pre-stage optical amplification part 21, and the channel is amplified to a predetermined level and output to the function component 22.

In the function component 22, deterioration of the signal light occurred in the transmission path is compensated by executing a chromatic dispersion compensation or a polarization mode dispersion compensation with respect to the light output from the pre-stage optical amplification part 21. At the time, since the power of the signal light is lowered by optical loss of the function component 22, a compensation of the optical loss is executed by the post-stage optical amplification part 23. Herewith, the signal light whose power is adjusted to be constant is output from the post-stage optical amplification part 23. Noise light such as ASE generated in the pre-stage and post-stage optical amplification parts 21, 23 is included in the light output from the post-stage optical amplification part 23 in addition to the amplified signal light of a single wavelength. The noise light is continuously distributed over a wide wavelength range including the signal band of the WDM light (see lower part of FIG. 3). Accordingly, the light output from the post-stage optical amplification part 23 has a smaller ratio as for the power of the signal light of a single wavelength with respect to the total power of the noise light.

The output light of the post-stage optical amplification part 23 is provided to the cyclic filter part 24. Herewith, the optical component corresponding to the transmission band cyclically repeated of the cyclic filter part 24 is transmitted through the cyclic filter part 24 and transmitted to the demodulator 25, and the optical component corresponding to the band of a valley of each transmission band (reflection band) is reflected in the direction opposite to the direction having been propagated, or in the direction toward the outside of the optical path. Herewith, the transmission light of the cyclic filter part 24 includes signal light of a single wavelength that is received and processed by the optical receiver module and unnecessary lights respectively corresponding to each wavelength of the other signal lights. On the other hand, the reflection light of the cyclic filter part 24 includes unnecessary lights respectively corresponding to the center wavelength of each signal light included in the WDM light.

Note that, that unnecessary light distributed outside the signal band of the WDM light is included in transmission light or reflection light is determined in accordance with a specific type of the optical filter used for the cyclic filter part 24. That is, when an optical filter having a wavelength characteristic in which the transmittance becomes high outside the signal band is used, unnecessary light outside the signal band is included in the transmission light of the cyclic filter part 24. Further, when an optical filter having a wavelength characteristic in which the transmittance becomes low outside the signal band is used, unnecessary light outside the signal band is included in the reflection light of the cyclic filter part 24. Further, when an optical filter having a wavelength characteristic in which the transmittance is cyclically changed also outside the signal band similar to inside the signal band, unnecessary light outside the signal band is included in both of the transmission light and reflection light of the cyclic filter part 24.

Figure 9:
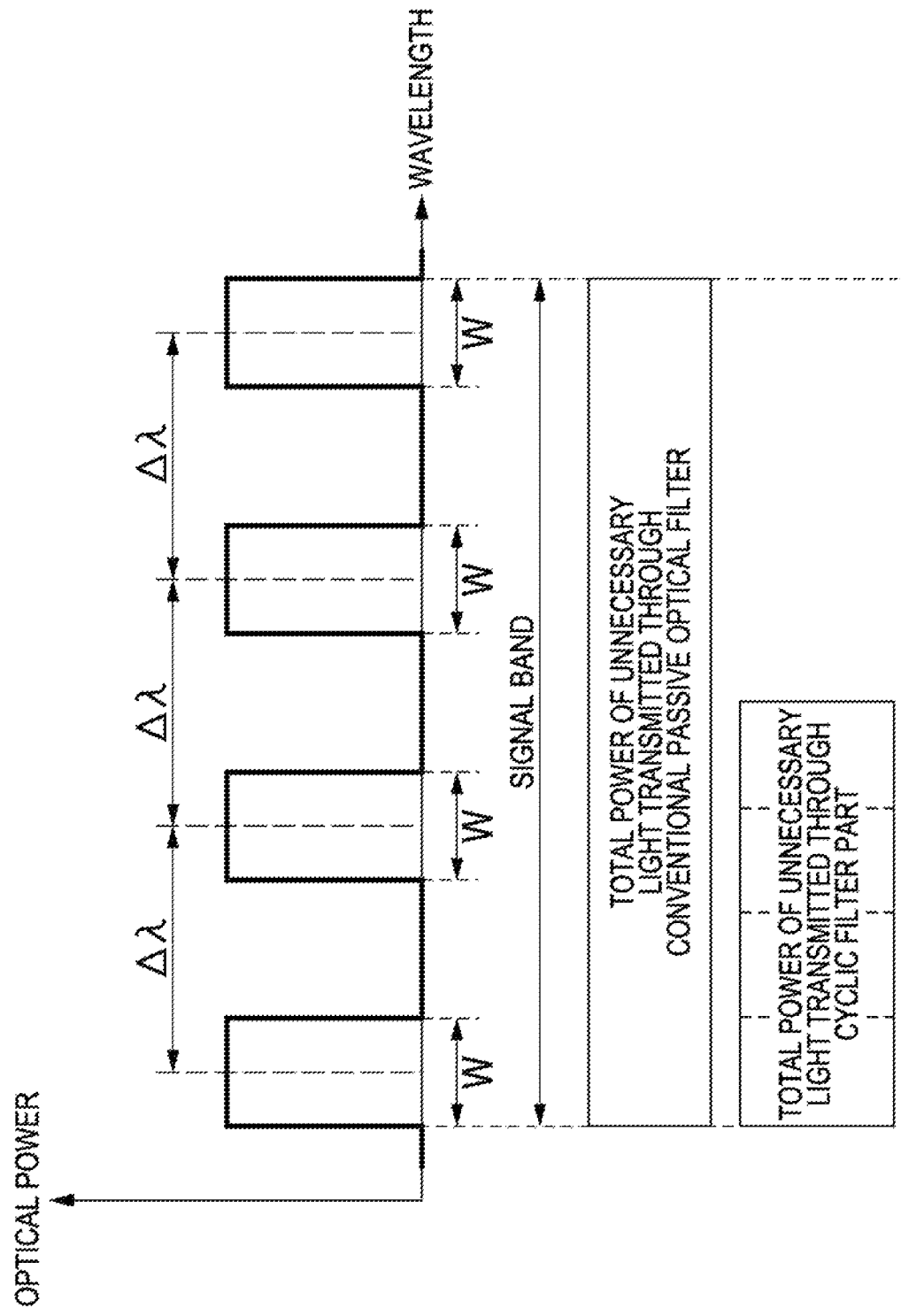
FIG. 9 is a conceptual diagram illustrating the total power of unnecessary light transmitted through the cyclic filter part in the first embodiment.

FIG. 9 is a conceptual diagram illustrating the total power of unnecessary light transmitted through the cyclic filter part 24. However, for the sake of easy description, the number of channels of the WDM light shall be four, and the power of the unnecessary light shall have a flat wavelength characteristic so as to be even in the signal band of the MDM light. In the upper part of FIG. 9, the horizontal axis indicates the wavelength, and the vertical axis indicates the optical power, and an appearance of the power of the unnecessary light passed through the cyclic filter part 24 is illustrated by a solid line. Further, the position of a dashed line in the drawing corresponds to the center wavelength of each channel, $\Delta\lambda$ indicates the channel distance, and W indicates a full width at half maximum (FWHM) of each transmission band of the cyclic filter part 24.

As illustrated in the upper part of FIG. 9, by providing the output light of the post-stage optical amplification part 23 to the cyclic filter part 23, unnecessary light in the signal band is cut out in a comb like shape and transmitted to the demodulator 25. The total power (integrated value) of the unnecessary light transmitted through the cyclic filter part 24 is reduced to the half as compared with the total power of the unnecessary light transmitted through a passive optical filter of the related art in which the whole transmission band of the WDM light is the transmission band (see the middle part of FIG. 5). Specifically, the total power of the unnecessary light transmitted through the cyclic filter part 24 is reduced to $W/\Delta\lambda$ as compared with the total power of the unnecessary light in the entire signal band. Consequently, the ratio of the power of the signal light of a single wavelength with respect to the total power of unnecessary light in the light input to the demodulator 25 becomes large. That is, the removal effect of the unnecessary light when applying the cyclic filter part 24 becomes larger than when the entire signal bane is the transmission band.

Herein a concrete example of the transmission wavelength characteristic of the cyclic filter part 24 corresponding to the channel arrangement of the WDM light will be described. However, the technique is not limited to the transmission wavelength characteristic.

Assuming the case where the channel distance $\Delta\lambda$ of the WDM light received by the optical receiver 1 is 1.6 nm (200 GHz), and the shift amount of the center wavelength of each channel occurred by, for example, variation of the output wavelength of the signal light source is not more than ±0.1 nm, the distance of the center wavelength of the cyclically repeated transmission band of the cyclic filter part 24 becomes 1.6 nm. Further, the full width at half maximum of each transmission band (transmission band of 3 dB) may be set within the range so as to be wider 0.2 nm and narrower than 1.6 nm. It is preferable that the upper limit of the full width at half maximum is note more than the half of the channel distance of the WDM light. It becomes possible to reduce the total power of the unnecessary light in the light input to the demodulator 25 by not less than 3 dB by setting the full width at half maximum so as to be within the range of 0.2 nm to 0.8 nm, the total power of unnecessary light in the input light to the demodulator 25 may be reduced by not less than 3 dB.

Further, when the channel distance Δλ of the WDM light is 0.8 nm (100 GHz), and the shift amount of the center wavelength of each channel is not more than ±0.1 nm, the distance of the center wavelength of the transmission band of the cyclic filter part 24 becomes 0.8 nm. The full width at half maximum of each transmission band may be set longer than 0.2 nm and shorter than 0.8 nm, and preferably, 0.2 nm to 0.4 nm.

Further, when the channel distance Δλ of the WDM light is 0.4 nm (50 GHz), and the shift amount of the center wavelength of each channel is not more than ±0.05 nm, the distance of the center wavelength of the transmission band of the cyclic filter part 24 becomes 0.4 nm. The full width at half maximum of each transmission band may be set longer than 0.1 nm and shorter than 0.4 nm, and preferably, 0.1 nm to 0.2 nm.

Note that, as for the removal effect of the unnecessary light by the cyclic filter part 24, when compared with the case where an active optical filter having the transmission band corresponding to the signal light of a single wavelength described with reference to FIG. 6 is applied, the effect obtained by applying the cyclic filter part 24 is inferior. However, the cyclic filter part 24 is a passive optical filter whose transmission wavelength characteristic is basically fixed. Accordingly, the structure is simple and the cost is low as compared with an active optical filter. In addition, it is not necessary to provide a complicated control mechanism. Further, the cyclic filter part 24 is common for the signal light of each wavelength included in the WDM light, so that the cyclic filter part 24 has the same general purpose properties as those of an active optical filter. That is, the optical receiver modules 13_1 to 13_n to which the cyclic filter part 24 is applied is capable of coping with variation of the reception wavelength due to, for example, switching of the optical path, and the management is easier than an active optical filter when considering that it is basically not necessary to control the filter property.

Accordingly, the optical receiver 1 to which the cyclic filter part 24 is applied has the most balanced structure when totally judging the removal effect of unnecessary light, and the cost, the size (mounting space), and the operability of the optical receiver.

Next, an optical receiver according to the second embodiment will be described.

Figure 10:
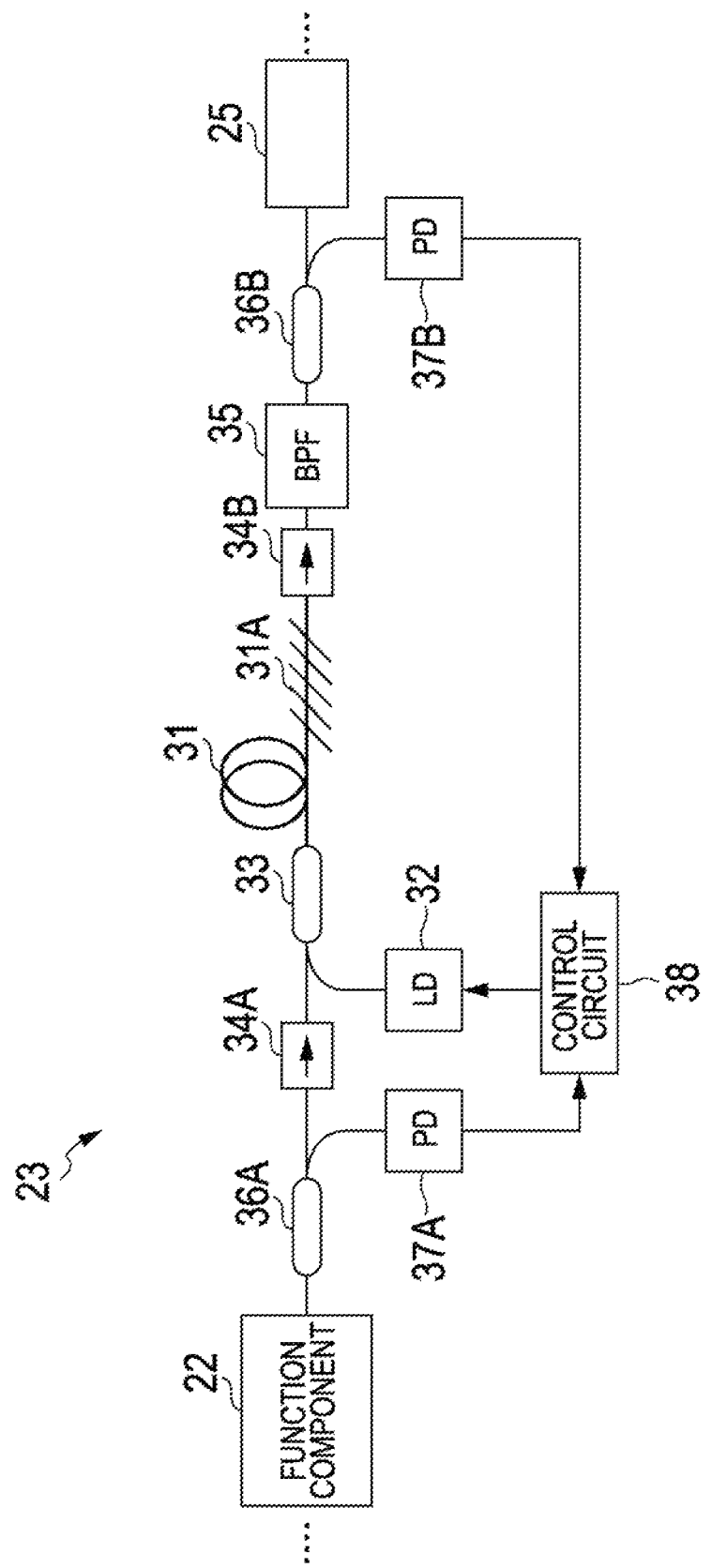
FIG. 10 is a diagram illustrating the main part structure of each optical receiver module in an optical receiver according to a second embodiment.

FIG. 10 is a diagram illustrating the main part structure of each optical receiver module in the optical receiver according to the second embodiment. Note that the entire structure of the optical receiver is similar to the case of the first embodiment illustrated in FIG. 7.

In FIG. 10, in each optical receiver module 13_1 to 13_n of the embodiment, an erbium doped fiber amplifier (EDFA) is respectively provided on an optical path between the function component 22 and the demodulator 25 as the post-stage optical amplification part 23. In the EDFA, a fiber Bragg grating (FBG) part 31A is formed at the signal output terminal side of an erbium doped fiber (EDF) 31 which becomes an amplification medium. A multiplexer 33 is connected to a signal input terminal of the EDF 31. The multiplexer 33 multiplexes the signal light output from the function component 22 and thereafter passed through a divider 36A and an optical isolator 34A and the excitation light output from an excitation light source (LD) 32 and provides to the EDF 31. Note that similar to the case of the first embodiment, the function part 22 may be arranged at any position on the optical path of the pre-stage of the demodulator 25.

The FBG part 31A has a cyclic transmission wavelength characteristic corresponding to the channel distance of the WDM light received by the optical receiver. The FBG part 31A is formed by radiating ultraviolet ray at a predetermined position of the EDF 31 at a signal output terminal side. As a concreted forming method, for example, by using a Kr—F excimer laser of 248 nm as the light source of the ultraviolet ray, ultraviolet ray output from the light source is radiated to the EDF 31 for a constant period. Then, the radiated position by the ultraviolet ray on the EDF 31 is shifted by a desired grating cycle, and the ultraviolet ray is radiated for the constant period again. By repeatedly executing the radiation processing of ultraviolet ray, the FBG part 31A is formed on the EDF 31. Note that, the forming method of the FBG 31A is not limited to the example, and it is possible to employ a known method such as a method for forming the FBG part 31A by collectively exposing the EDF 31 by ultraviolet ray by using a mask created to correspond to a desired grating cycle.

Figure 11:
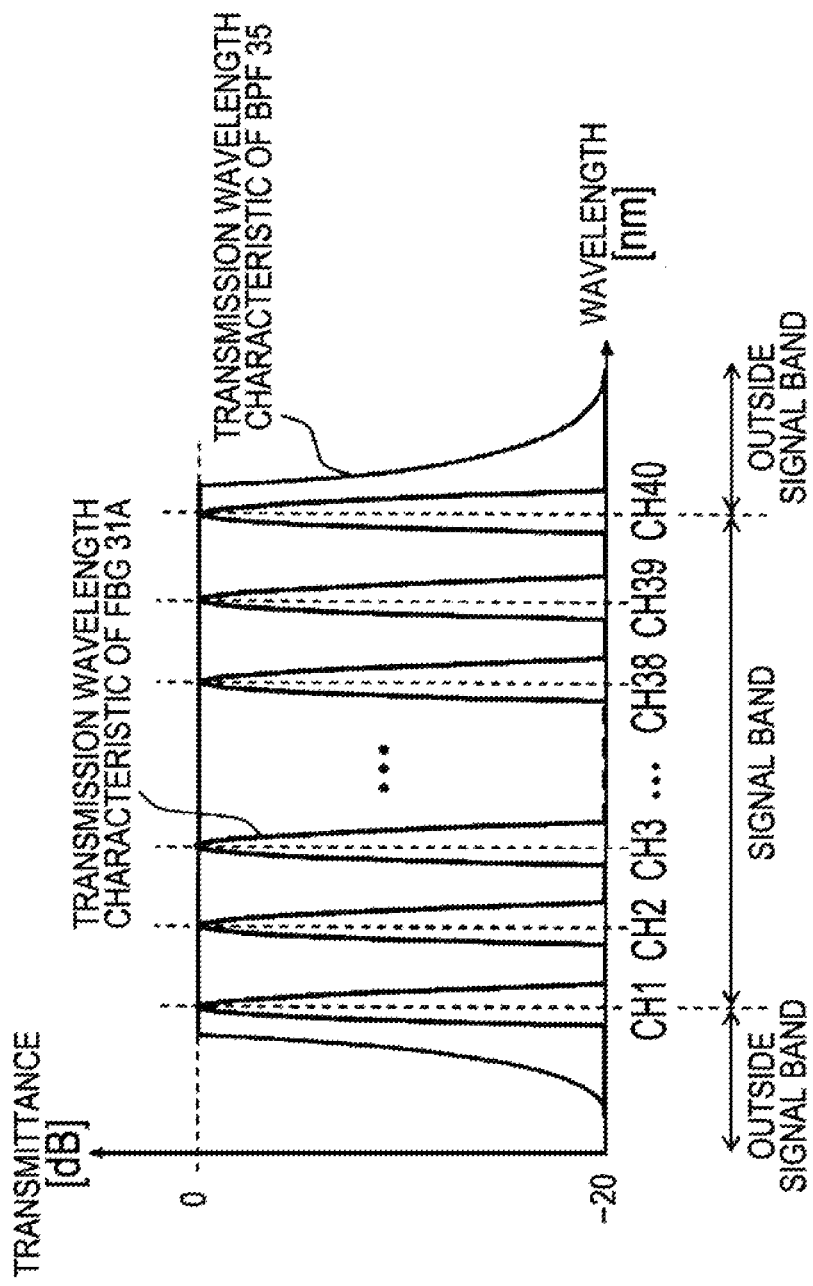
FIG. 11 is a diagram illustrating each transmission wavelength characteristic of a FBG part and a BPF according to the second embodiment.

A band path pass filter (BPF) 35 is connected to a signal output terminal of the EDF 31 on which the FBG part 31A is formed via an optical isolator 34B. In the BPF 35, the entire signal band of the WDM light is a pass band, and the BPF 35 removes unnecessary light outside the signal band corresponding to a cutoff band. FIG. 11 collectively illustrates each transmission wavelength characteristic of the FBG part 31A and the BPF 35. The light passed through the BPF 35 is transmitted to the demodulator 25 via a divider 36B. In the structure, the filter function corresponding to the cyclic filter part 24 in the first embodiment is provided by the combination of the FBG part 31A and the BPF 35.

Further, the EDFA is also equipped with a control circuit 38 that controls a driving state of the excitation light source 32. The control circuit 38 executes a feedback control of the power of the excitation light supplied from the excitation light source 32 to the EDF 31 such that the output optical power becomes a desired level based on the input optical power detected by the divider 36A and a light detector (PD) 37A, and the output optical power detected by the divider 36B and a light detector (PD) 37B.

Figure 12:
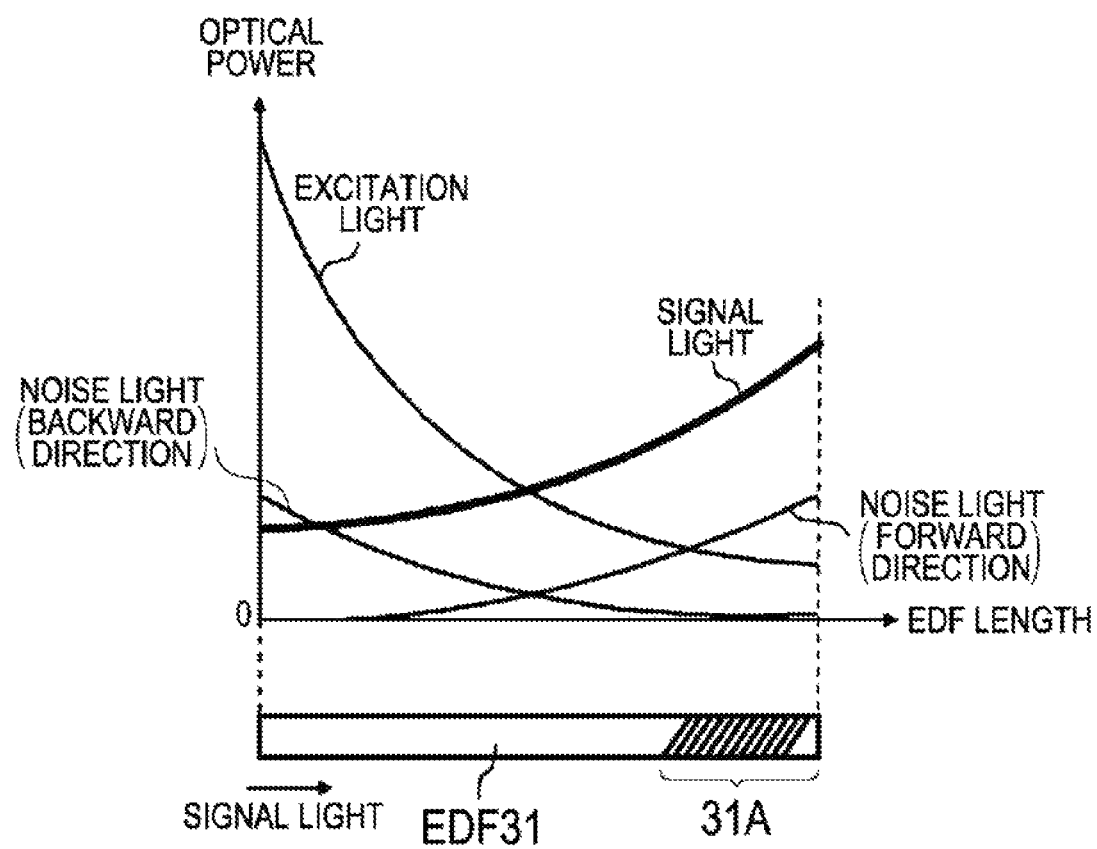
FIG. 12 is a diagram exemplifying variations of the power of signal light, excitation light, and noise light that propagate an EDF in the second embodiment.

FIG. 12 exemplifies variations of the power of signal light, excitation light, and noise light that propagate the EDF 31. The energy of the excitation light provided at the signal input terminal side of the EDF 31 is absorbed by erbium ion. Accordingly the power is reduced as the excitation light propagates in the signal output terminal direction. On the other hand, the power of the signal light (signal light of a single wavelength) is increased by an induced emission phenomenon of excited erbium ion as the signal light propagates the EDF 31. The noise light (ASE) generated when amplifying the signal light proceeds in the EDF 31 in the direction (forward direction) that is the same direction as the propagation direction of the signal light and in the opposite direction (backward direction). The power of the noise light that proceeds in the forward direction becomes the maximum at the signal output terminal of the EDF 31, and the power of the noise light that proceeds in the backward direction becomes the maximum at the signal input terminal of the EDF 31.

When the noise light that proceeds in the front direction in the EDF 31 reaches the FBG 31A formed at the signal output terminal side of the EDF 31, a component corresponding to each channel of the WDM light and a component outside the signal band are transmitted through the FBG part 31A, and a component between each channel is reflected by the FBG part 31A. At the time, when the structure of the FBG part 31A is a blazed Bragg grating in which a grating face is inclined by a predetermined angle with respect to the longitudinal direction of the EDF 31, or a long period fiber grating, the reflection light at the FBG part 31A is radiated outside the EDF 31 (clad), so that the reflection light is prevented to proceed in the same direction as the signal light.

The application example of a blazed Bragg grating or a long period fiber grating in which the light reflected at the FBG part 31A is radiated outside the EDF 31 is illustrated herein. However, the structure may be employed in which a grating surface of the FBG part 31A is formed to be perpendicular to the longitudinal direction of the EDF 31, and the light reflected by the FBG part 31A proceeds in the direction opposite to the signal light in the EDF 31. In this case, the reflection light proceeded in the reverse direction in the EDF 31 is decayed by the optical isolator 34A. Accordingly, it is prevented that the light reflected by the FBG part 31A is returned to the function component 22 side to deteriorate the quality of the signal light.

The light transmitted through the FBG part 31A (signal light of a single wavelength, unnecessary light corresponding to each channel of the WDM light, and unnecessary light outside the signal band) is passed through the optical isolator 34B, and then, provided to the BPF 35, and the unnecessary light outside the signal band is removed by the BPF 35. The signal light of a single wavelength and the unnecessary light corresponding to each channel of the WDM light is input in the demodulator 25 via the divider 36B, and a reception processing is executed.

According to the optical receiver according to the second embodiment, the FBG part 31A having a cyclic characteristic corresponding to each channel of the WDM light is formed at the signal output terminal side of the amplification medium (EDF 31) of the EDFA used as the post-stage optical amplification part 23 of each optical receiver module 13_1 to 13_*n*. Herewith, it becomes possible to simplify and downsize the structure of each optical receiver module. Further, by connecting the BPF 35 for removing the unnecessary light outside the signal band of the WDM light in series with the FBG part 31A, the removal effect of unnecessary light may be further improved.

The improvement of the removal effect of the unnecessary light by the BPF 35 is specifically effective when the signal band of the WDM light is L-band (1570 nm to 1600 nm). That is, when the signal band of the WDM light is C-band (1530 nm to 1600 nm), since the EDFA is operated in a reverse distribution state, wavelength dependency of noise light generated when amplifying light is large, and when considering the total power of the noise light, the power of the unnecessary light in the signal band becomes dominative. Accordingly, in the case of C-band, it is effective to remove unnecessary light in the signal band by the FBG part 31A. On the other hand, when the signal band of the WDM light is L-band, since the EDFA is operated in a reverse distribution state, wavelength dependency of noise light generated when amplifying light is small (flatness of a wavelength characteristic is high), and when considering the total power of noise light, the power of unnecessary light outside the signal band may not be ignored. Accordingly, in the case of L-band, it is effective to remove not only the unnecessary light in the signal band by the FBG part 31A, but also the unnecessary light outside the signal band by the BPF 35.

Figure 13:
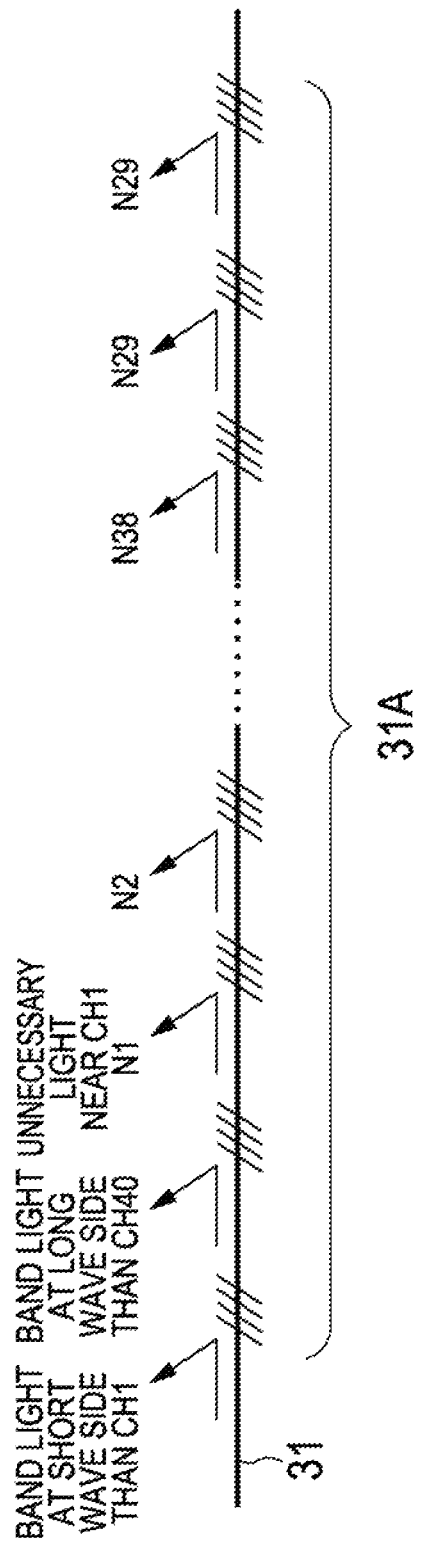
FIG. 13 is a diagram illustrating a concrete example of another FBG part related to the second embodiment.

Note that, in the second embodiment, the example in which the BPF 35 is provided at the post-stage of the FBG part 31A to remove the unnecessary light outside the signal band when the transmission wavelength characteristic of the FBG part 31A has the characteristic by which the light outside the signal band is transmitted is illustrated. However, the BPF 35 may be omitted when the transmission wavelength characteristic of the FBG part 31A is a characteristic by which the light outside the signal band is reflected. A concrete example of the FBG part 31A in this case is illustrated in FIG. 13. In the concrete example of the FBG part 31A, the number of the channels of the WDM light corresponds to 40. The FBG part 31A has a plurality of grating elements for transmitting each channel CH1 to CH 40 and reflecting unnecessary light N1 to N40 near each of the grating elements, and a grating element for reflecting unnecessary light at a short wave side band than the channel CH1 and a grating element for reflecting unnecessary light at a long wave side band than the channel 40 are provided at the pre-stage of the sequential grating elements corresponding to each channel CH1 to CH40. In the FBG part 31A, unnecessary light outside the WDM light is radiated outside the EDF 31 in addition to unnecessary light between each channel CH1 to CH40.

Figure 14:
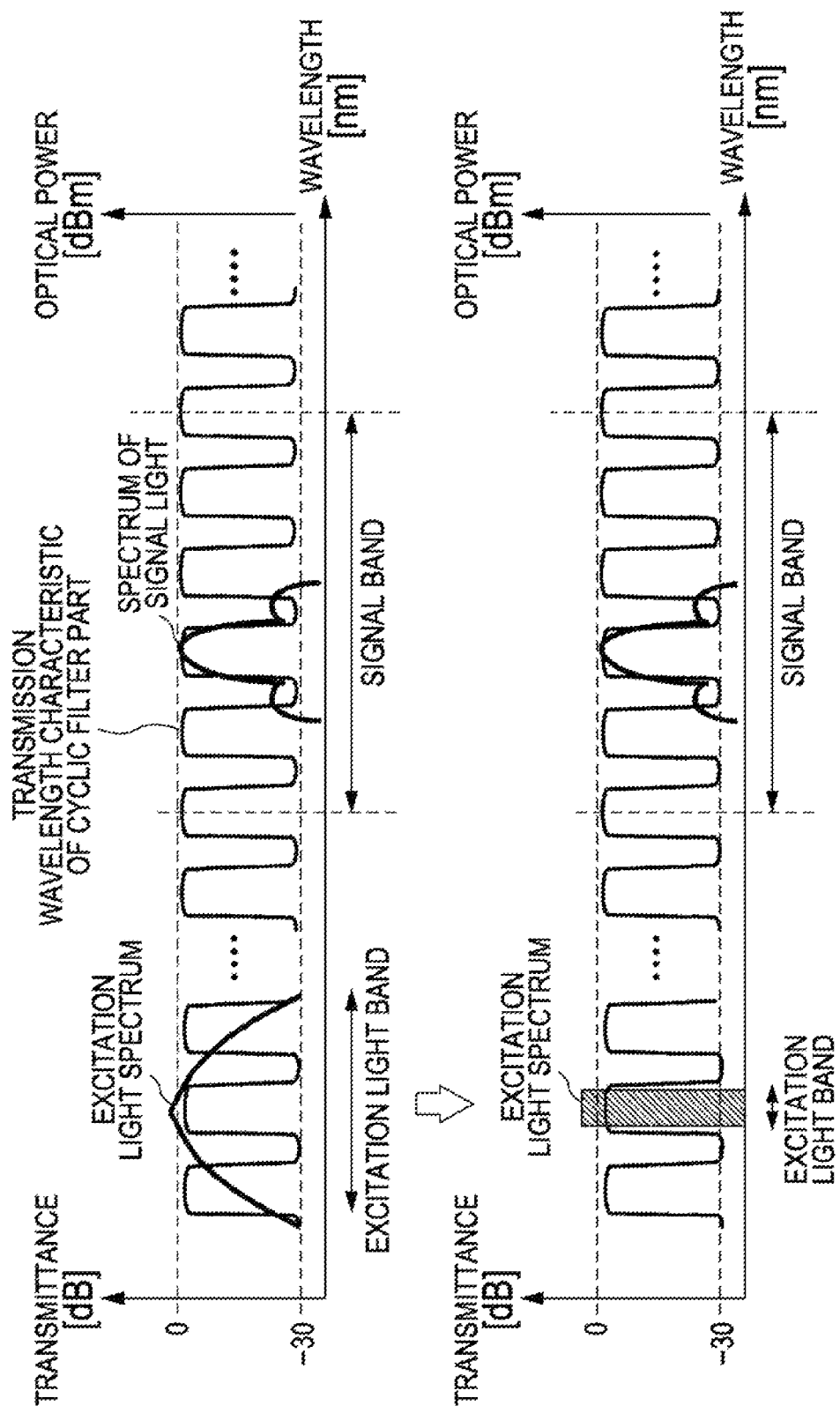
FIG. 14 is a diagram illustrating an application example corresponding to a backward excitation or a bidirectional excitation in relation with the second embodiment.

Further, in the second embodiment, the constitution example is illustrated in which an EDFA of a forward excitation type in which excitation light is supplied to the EDF 31 from the signal input terminal. However, the technique is not limited to this, and an EDFA of a backward excitation type in which excitation light is supplied from the signal output terminal to the EDF, or a bidirectional excitation type in which excitation light is supplied from the input signal terminal and output signal terminal to the EDF may be applied as the post-stage optical amplification part 23. In the case of the backward excitation type or the bidirectional excitation type, it is necessary for the transmission wavelength characteristic of the RBG part formed at the signal output terminal side of the EDF to have a cyclic nature corresponding to the channel distance of the WDM light, and to have a characteristic capable of transmitting excitation light. Specifically, for example, as illustrated in FIG. 14, assuming the case where the FBG part has a wavelength characteristic in which transmittance is cyclically changed also in the outside of the signal band similarly to the inside of the signal band, the spectrum width of the excitation light generally becomes wider than the width of one transmission band of the FBG part, and when the excitation light is passed through the FBG part without change, the supply power of the excitation light is lowered (upper part of FIG. 14) In order to avoid this, the excitation light spectrum is made to be a narrow band by using wavelength fixing device not illustrated, and an excitation light spectrum is fallen in one transmission band of the FBG part.

Next, a third embodiment of an optical receiver will be described.

Figure 15:
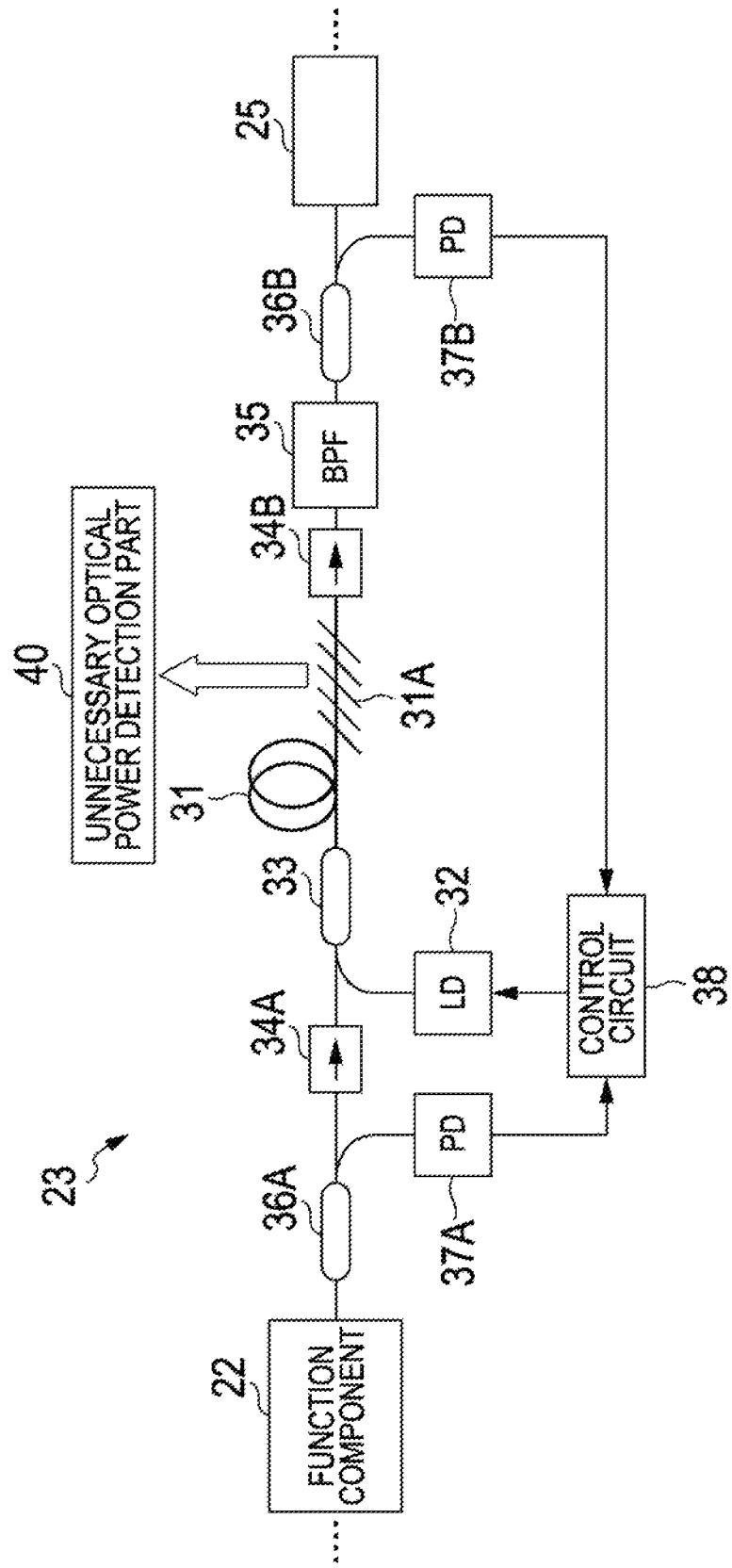
FIG. 15 is a diagram illustrating the main part structure of each optical receiver module in an optical receiver according to a third embodiment.

FIG. 15 is a diagram illustrating the main structure of each optical receiver module in the optical receiver according to the third embodiment. In the optical receiver of the embodiment, an unnecessary optical power detection unit 40 for detecting the power of unnecessary light reflected by the FBG part 31A and radiated outside the EDF 31 is added to the structure of each optical receiver module of the second embodiment illustrated in FIG. 10. Note that, the structure except the unnecessary optical power detection unit 40 in each optical receiver module is the same as that in the case of the second embodiment, and the entire structure of the optical receiver is the same as that in the case of the first embodiment illustrated in FIG. 7. Accordingly, the descriptions will be omitted.

Figure 16:
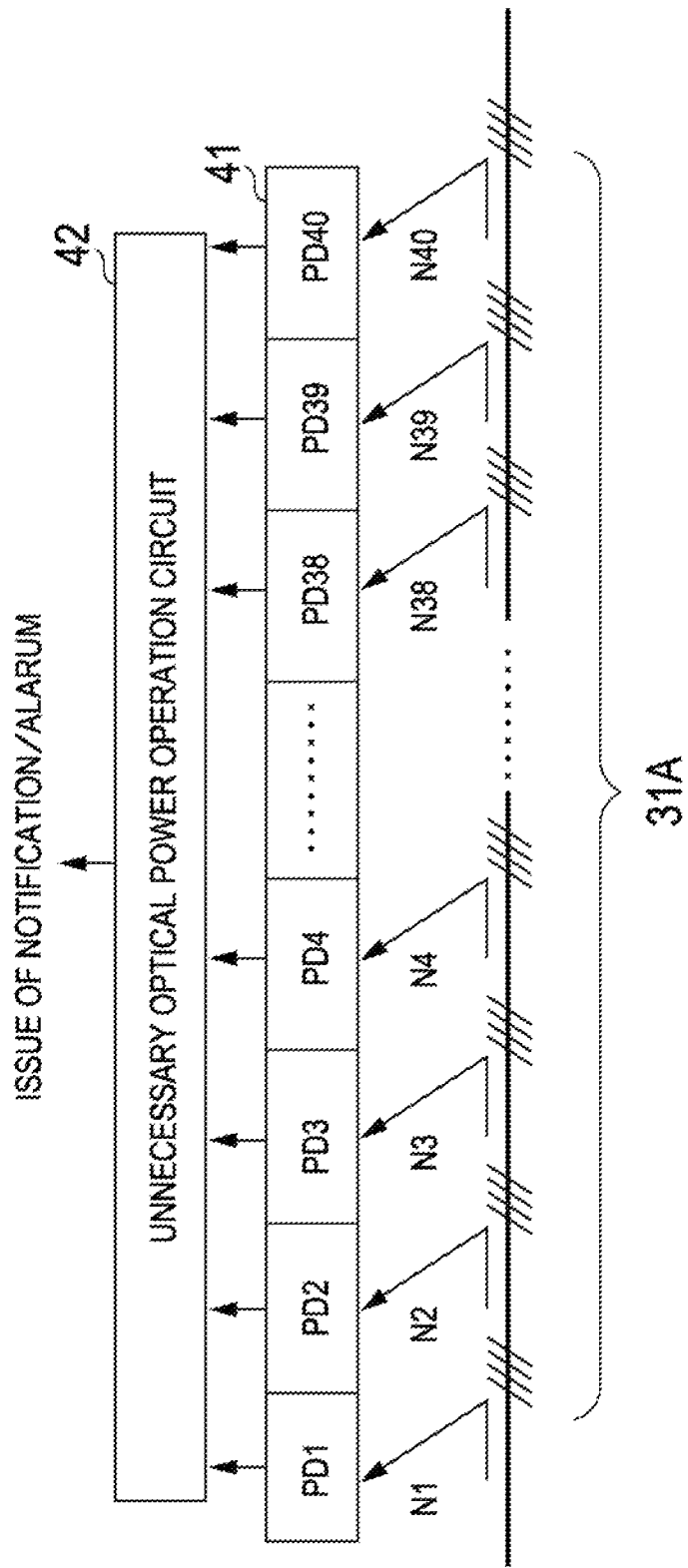
FIG. 16 is a diagram illustrating an example of the structure of an unnecessary optical power detection unit according to the third embodiment.

FIG. 16 illustrates an exemplary concrete structure of the unnecessary optical power detection unit 40 in the case where a blazed Bragg grating is employed as the structure of the FBG part 31A. In the example of FIG. 16, the unnecessary optical power detection unit 40 is constituted by a light receiving part 41 and an unnecessary optical power operation circuit 42.

In the light receiving part 41, light receiving elements PD1 to PD40 corresponding to the channel number (herein, example of 40 channels is illustrated) of the WDM light received by the optical receiver are arranged in one row. A light receiving face of each of the light receiving elements PD1 to PD 40 is positioned on the optical path of each unnecessary light N1 to N40 reflected by each grating element of the FBG part 31A and radiated outside the EDF 31. Each unnecessary light N1 to N40 is photoelectrically converted and the generated electric signal is output to the unnecessary optical power operation circuit 42 by each of the light receiving elements PD1 to PD40.

The unnecessary optical power operation circuit 42 calculates the unnecessary optical power near each channel CH1 to CH40 that is removed by the FBG part 31A based on the output signal from each light receiving element PD1 to PD 40 of the light receiving part 41. The calculated result is notified to an outer part as information related to noise light for obtaining the signal to noise ratio of the received WDM light (OSNR). Further, for example, the unnecessary optical power operation circuit 420 may detect an abnormal operation of the pre-stage or post-stage optical amplification part 21, 23 or an abnormal of the WDM transmission system to which the optical receiver is applied based on the calculated result of the unnecessary optical power to issue an alarm for reporting the occurrence of the abnormal to an outer part. The detection of the occurrence of an abnormal may be executed when the calculated value of the total power of the unnecessary light becomes larger than a threshold value predetermined in accordance with the value of the total power of the unnecessary light at the normal operation time.

According to the optical receiver of the third embodiment, in addition to the removal effect of unnecessary light similar to the case of the second embodiment, a function for monitoring the unnecessary light included in the received light in real time may be easily provided. This makes it possible to easily execute maintenance for normal management of the WDM transmission system.

In the third embodiment, the constitution example in which each light receiving element PD1 to PD40 of the light receiving part 41 is arranged to correspond to every unnecessary light N1 to N40 reflected by each grating element of the FBG part 31A is illustrated. However, in the case where the detected result by the unnecessary optical power detection part 40 is used for an OSNR monitor for receiving light, a wavelength band in which noise light generated by the optical amplifier for a single wavelength is the maximum may be selected to dispose the light receiving element only on the optical path of the unnecessary light corresponding to the selected wavelength among each unnecessary light N1 to N40 reflected by each grating element of the FBG part 31A. As a concrete example, when the signal band of the WDM light is C-band, the power of the noise light generated by the EDFA becomes the maximum near 1530 nm. In this case, the light receiving element is arranged only on the optical path of unnecessary light near channel CH1 arranged near wavelength of 1530 nm among the light reflected by the FBG part 31A. The reason for selectively monitoring the wavelength band at which the power of noise light becomes the maximum is that there is a problem in a reception property of a channel whose OSNR becomes the worst when each channel of the WDM light is received and processed. The application of the structure is effective in downsizing and cost reduction of the optical receiver since the structure of the unnecessary light power detection unit 40 may be simplified.

Figure 17:
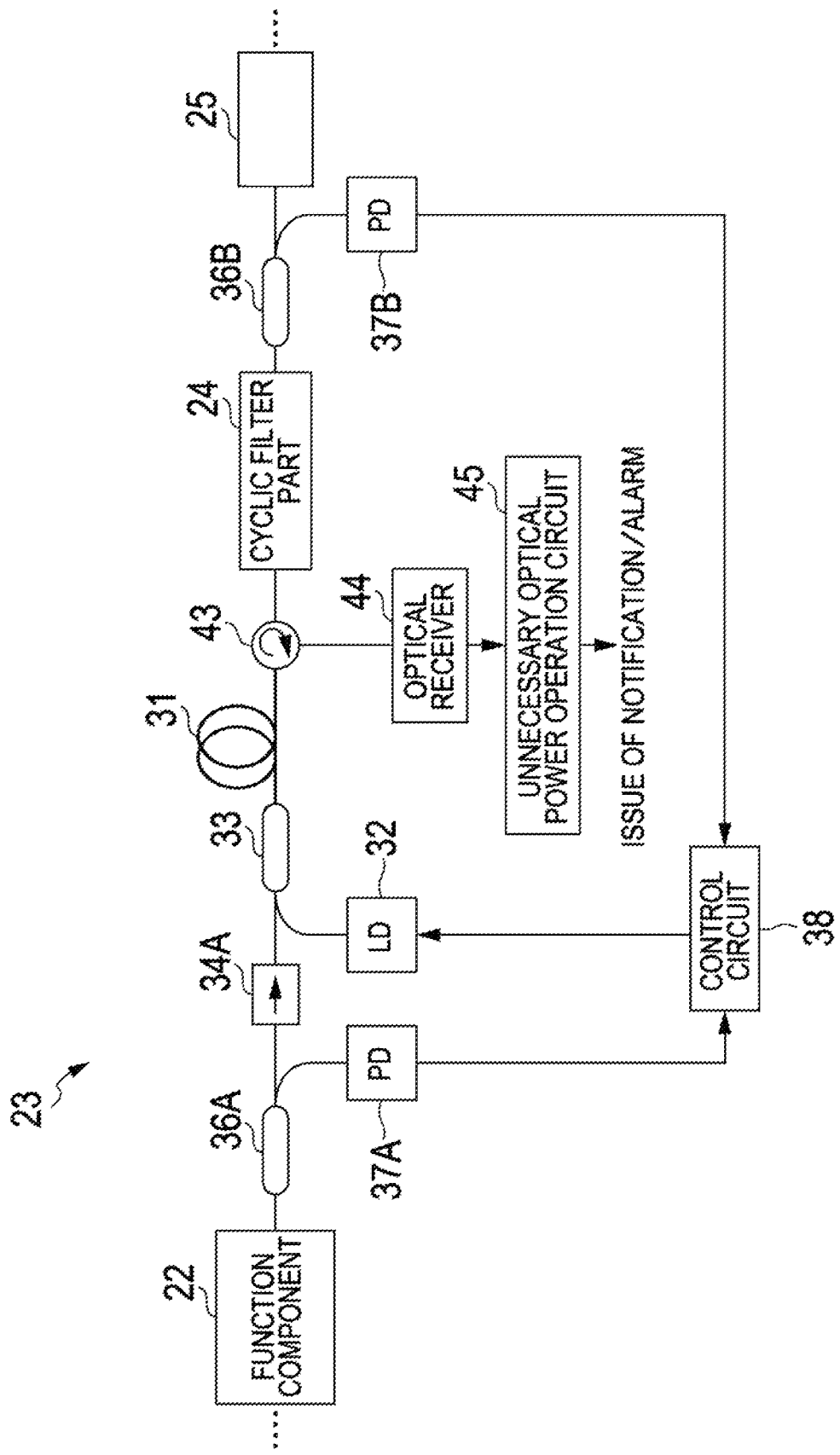
FIG. 17 is a diagram illustrating the main part structure of another optical receiver module related to the third embodiment.

Further, in the third embodiment, a blazed Bragg grating is employed as the structure of the FBG part 31A, and reflection light of the FBG part 31A is radiated outside the EDF 31. However, the structure in which the unnecessary optical power detection unit 40 is added is not limited to the aforementioned case. For example, as illustrated in FIG. 17, in the case where an optical filter using a Fabry Perot interferometer or the like is employed as the cyclic filter part 24, and unnecessary light removed by the cyclic filter part 24 is returned in the reverse direction of the single light, an optical circulator 43 having three ports is provided instead of the optical isolator (corresponding to 34B of FIG. 10) arranged at the output side of the post-stage optical amplification part 23 using an EDFA or the like. In the optical circulator 43, the signal output terminal of the EDF 31 is connected to a first port, the input terminal of the cyclic filter part 24 is connected to a second port, and an optical receiver 44 is connected to a third port. The output signal of the optical receiver 44 is provided to an unnecessary light power operation circuit 45.

In the structure of FIG. 17, the unnecessary light removed by the cyclic filter part 24 and propagated in the direction opposite to the signal light is provided to the optical receiver 44 from the second port via the third port of the optical circulator 43. In the optical receiver 44, unnecessary light from the third port of the optical circulator 43 is photoelectrically converted, and the electric signal is output to the unnecessary optical power operation circuit 45. In the unnecessary optical power operation circuit 45, similarly to the unnecessary optical power operation circuit 42 of the third embodiment, the unnecessary optical power removed by the cyclic filter part 24 is calculated based on the output signal from the receiver 44, and a notification or an alarm of the calculated result is issued to an outer part.

Next, an optical receiver according to a fourth embodiment will be described.

Figure 18:
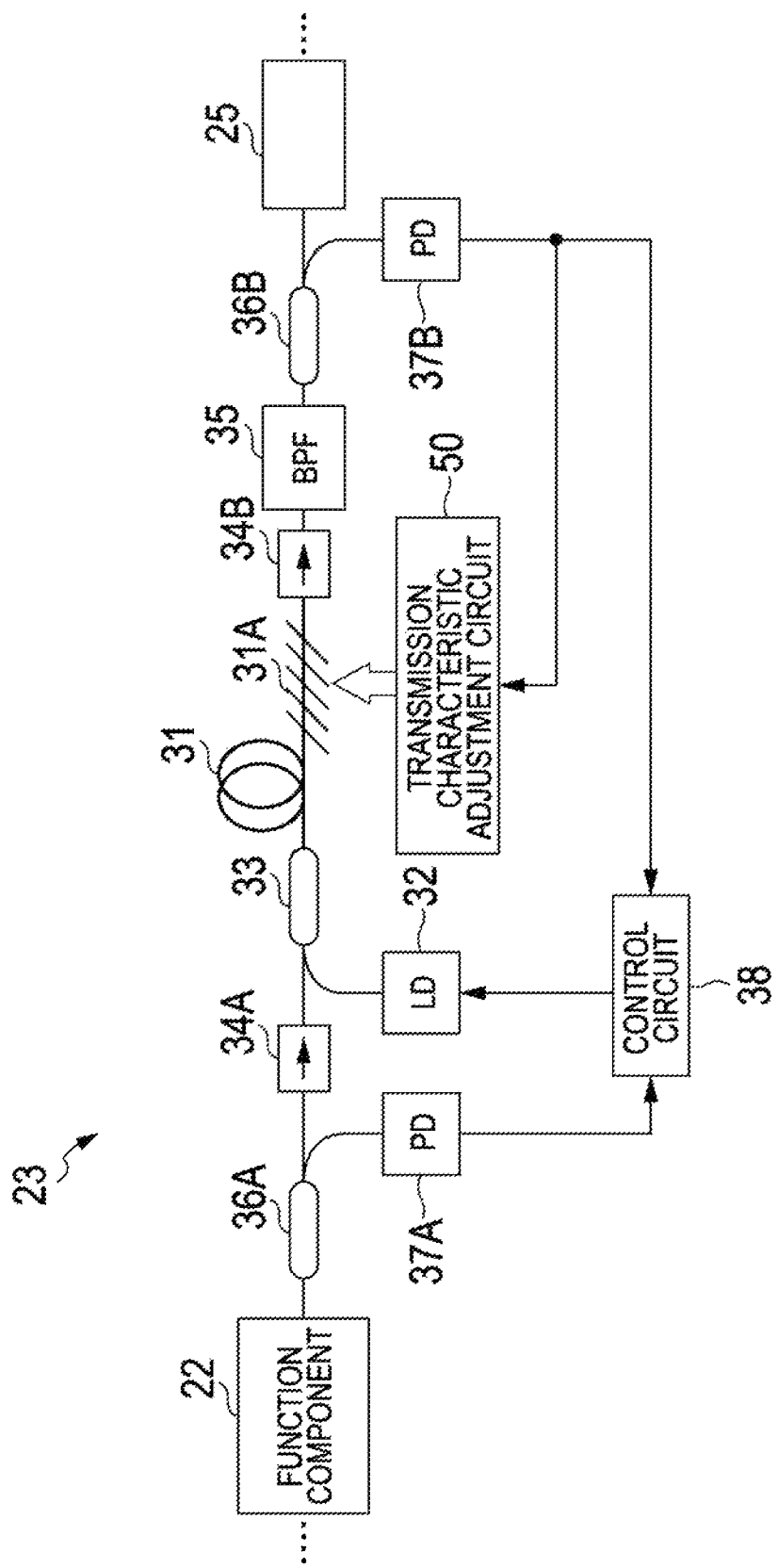
FIG. 18 is a diagram illustrating the main part structure of each optical receiver module in an optical receiver according to a fourth embodiment.

FIG. 18 is a diagram illustrating the main part structure of each optical receiver module of the optical receiver according to the fourth embodiment. In the optical receiver of the embodiment, a transmission characteristic adjustment circuit 50 for performing a fine adjustment (optimization) of a cyclic transmission wavelength characteristic of the FBG part 31A based on the output optical power detected by the light detector 37 at the output side of the post-stage amplification part 23 (EDFA) is added to the structure of each optical receiver module according to the second embodiment illustrated in FIG. 10. Note that, the structure except the transmission characteristic adjustment circuit 50 in the each optical receiver module is the same as that in the case of the second embodiment, and the entire structure of the optical receiver is the same as that in the case of the first embodiment illustrated in FIG. 7. Accordingly, the description will be omitted.

The transmission characteristic adjustment circuit 50 applies a stress to the FBG part 31A or adjusts the temperature of the FBG part 31A such that a monitor value becomes the maximum by using the monitor value corresponding to the power of the light in which the unnecessary light at the middle part of each channel of the WDM light and the unnecessary light outside the signal band of the WDM light (input light to the demodulator 25) by the output optical power detected by the light detector 37B, that is, the combination of the FBG part 31A and the BPF 35.

The transmission wavelength characteristic of the FBG part 31A is fixed. However, since, the grating distance or the like is changed by addition of the stress to the optical fiber (EDF 31) or variation of the temperature, it is possible to finely adjust the cyclic nature of the transmission wavelength characteristic. The power of the input light to the demodulator 25 becomes the maximum when the center wavelength of the channel to be received and processed (signal light of a single wavelength) and the center wavelength of the transmission band corresponding to the cannel of the FBG part 31A. Accordingly, the reception property may be made better by optimizing the transmission wavelength characteristic of the FBG part 31A by providing the transmission characteristic adjustment circuit 50.

The optimization of the transmission wavelength characteristic of the FBG part 31A by the transmission characteristic adjustment circuit 50 is specifically available when the removal effect of unnecessary light is enhanced by narrowing the width W of the transmission band corresponding to each channel of the FBG part 31A. That is, when the width W of each transmission band is narrowed, deterioration of the reception property becomes remarkable only when the center wavelength of the reception channel is shifted a little by, for example, variation of the wavelength of the signal light source. Accordingly, unnecessary light may be effectively removed by matching the center wavelength of the reception channel and the center wavelength of the transmission band by finely adjusting the transmission wavelength characteristic of the FBG part 31A by the transmission characteristic adjustment circuit 50. Accordingly, the reception characteristic may be effectively improved.

Figure 19:
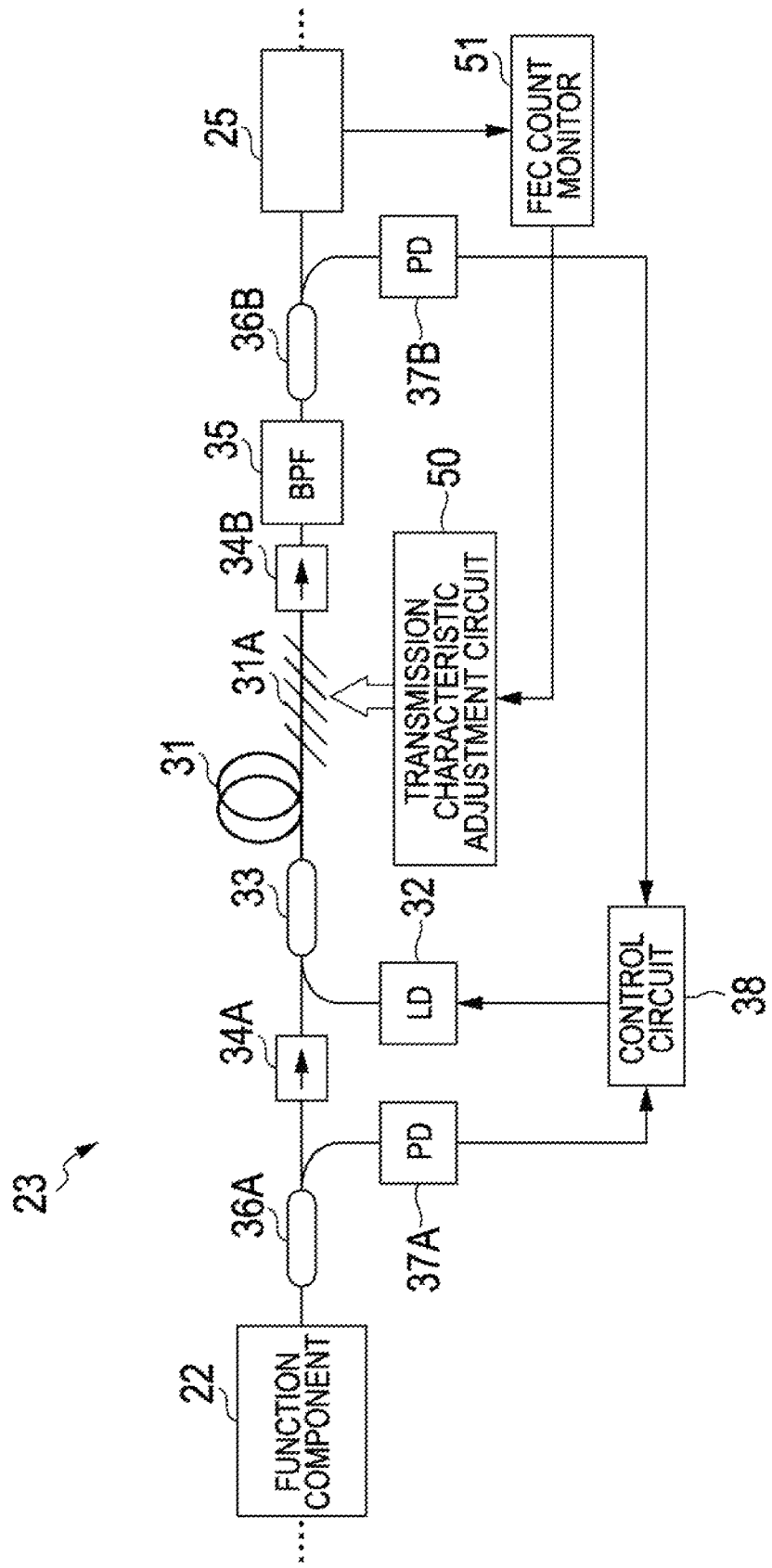
FIG. 19 is a diagram illustrating the min part structure of another optical receiver module related to the fourth embodiment.
Figure 20:
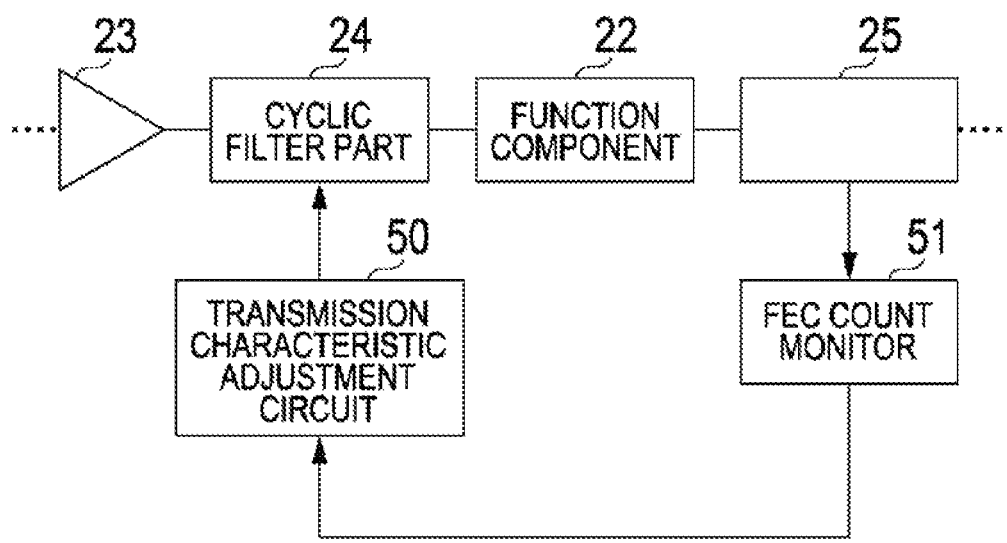
FIG. 20 is a diagram illustrating the main part structure of another optical receiver module related to the fourth embodiment.

Note that in the fourth embodiment, an example is illustrated in which the transmission wavelength characteristic of the FBG part 31A is finely adjusted based on the power of the output light detected by the light detector 37B. However, for example, as illustrated in FIG. 19, the number of error corrections in a forward error correction (FEC) processing executed by the demodulator 25 or the like may be counted by an FEC count monitor 51 to execute optimization of the FBG part 31A such that the number of error corrections in a predetermined period becomes the minimum. Further, the case is illustrated in which the control (fine adjustment) of the transmission wavelength property of the FBG part 31A is executed as for the structure of each optical receiver module in the second embodiment. However, for example, as illustrated in FIG. 20, it is also possible to optimize the transmission wavelength property of the cyclic filter part 24 similar to the case of the first embodiment by the transmission characteristic adjustment circuit 50 in accordance with a monitor result of the FEC count monitor 51.

Further, as an application example of each embodiment, the cyclic filter part of the technique may be provided not only in the optical receiver of the WDM transmission system, but also at an output part of a WDM optical amplifier 61 arranged on a transmission path 60 or on an optical path from an output of the WDM optical amplifier 61 to an input of a demultiplexer 62. Herewith, unnecessary light included in the output light of the WDM optical amplifier 61 may be efficiently removed. Note that in FIG. 21, the system structure of a point to point is exemplified. However, the system structure may be a ring structure including an optical branch insertion (OADM) node.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present invention have been described in detail, it should be understood that the various changes, substitutions, and alterations could be made hereto without departing from the spirit and scope of the invention.

What is claimed is:

1. An optical receiver to receive a wavelength channel signal light separated out of a wavelength division multiplexed signal light including a plurality of wavelength channel signal lights, the optical receiver comprising:
   an optical amplifier to amplify the wavelength channel signal light separated out from the wavelength division multiplexed signal light;
   a cyclic filter having a transmission wavelength characteristic in which transmittance is cyclically changed to correspond with a channel distance of the wavelength channel signal lights in the wavelength division multiplexed signal light, the cyclic filter passing the amplified wavelength channel signal light separated out from the wavelength division multiplexed signal light; and
   a demodulator operably connected to the cyclic filter to demodulate the wavelength channel signal light output from the cyclic filter into an electrical signal.

2. The optical receiver according to claim 1, wherein the wavelength channel signal light is separated out of the wavelength division multiplexed signal light by a demultiplexer, the optical receiver further comprising:
   a component to compensate signal deterioration of the wavelength channel signal light outputted from the demultiplexer, and
   wherein the cyclic filter transmits an optical component including a unnecessary light included in the amplified wavelength channel signal light separated out from the wavelength division multiplexed signal light corresponding to the transmission wavelength characteristic, and removes an optical component corresponding to a middle wavelength of the wavelength channel signal light separated out from the wavelength division multiplexed signal light among unnecessary light.

3. The optical receiver according to claim 2, further comprising:
   a pre-stage optical amplifier and a post-stage optical amplifier connected in series with the component, with the component being disposed on an optical path between the pre-stage optical amplifier and the post-stage optical amplifier.

4. The optical receiver according to claim 2, wherein after having the signal deterioration compensated by the component, the wavelength channel signal light separated out from the wavelength division multiplexed signal light is inputted to the optical amplifier to be amplified,
   the optical amplifier includes a rare earth doped fiber provided with excitation light so that the inputted wavelength channel signal light travels through the rare earth doped fiber and is thereby amplified, and
   the cyclic filter includes a fiber Bragg grating formed at a signal output terminal side of the rare earth doped fiber.

5. The optical receiver according to claim 4, wherein the cyclic filter includes an optical fiber including a pass band corresponding to a entire signal band of the wavelength division multiplexed light and a cutoff band corresponding to a component outside the signal band.

6. The optical receiver according to claim 1, wherein
   the cyclic filter includes a periodic transmission wavelength characteristic, transmission bands correspond, respectively, to the wavelength channel signal lights, each transmission band has the corresponding wavelength channel signal light as a center wavelength, and for each transmission band, a full width at half maximum of the respective transmission band is set wider than a wavelength width determined based on a shift amount of the center wavelength of the respective transmission band.

7. The optical receiver according to claim 1, wherein the cyclic filter includes a transmission band in which a full width at half maximum of the transmission band is narrower than or equal to the channel distance of the wavelength channel signal lights in the wavelength division multiplexed signal light.

8. The optical receiver according to claim 1, wherein the cyclic filter has a transmission wavelength characteristic for removing unnecessary light corresponding to a cutoff band.

9. The optical receiver according to claim 1, wherein the cyclic filter has a first optical filter and a second optical filter connected in series with the cyclic filter, the first optical filter having a cyclic transmission wavelength characteristic at least in a signal band of the wavelength division multiplexed light, and the second optical filter having a cutoff band corresponding to a component outside the signal band.

10. The optical receiver according to claim 1, further comprising an unnecessary optical power detector to detect a power of unnecessary light removed by the cyclic filter.

11. The optical receiver according to claim 10, wherein
the cyclic filter radiates the unnecessary light removed by the cyclic filter, and
the unnecessary optical power detector includes a light receiver having a light receiving face on an optical path of the unnecessary light radiated by the cyclic filter, a light converter to convert the unnecessary light into an electric signal and to output the electric signal, and an operation circuit to perform an operation on the basis of the outputted electric signal.

12. The optical receiver according to claim 11, wherein the light receiver selectively receives unnecessary light of wavelength having maximum power of noise light among the unnecessary light radiated by the cyclic filter.

13. The optical receiver according to claim 10, wherein
the cyclic filter makes the unnecessary light proceed in a reverse direction, and
the unnecessary optical power detector includes an optical circulator arranged on an optical path between the optical amplifier and the cyclic filter, an optical receiver to detect the unnecessary light made to proceed in the reverse direction by the cyclic filter, a converter to convert the unnecessary light detected by the optical receiver into an electric signal and to output the electric signal, and an operation circuit to perform an operation on the basis of the outputted electric signal.

14. The optical receiver according to claim 1, further comprising a transmission characteristic adjustment circuit into adjust a transmission characteristic of the cyclic filter on the basis of a detected optical power.

15. The optical receiver according to claim 14, wherein the transmission characteristic adjustment circuit monitors an optical power, and adjusts the transmission characteristic of the cyclic filter such that the monitor optical power becomes maximum.

16. The optical receiver according to claim 14, wherein the transmission characteristic adjustment circuit counts a number of error corrections and adjusts the transmission characteristic of the cyclic filter such that the number of error corrections becomes minimum.

17. The optical receiver according to claim 14, wherein the cyclic filter includes a optical filter using a fiber Bragg grating, and the transmission characteristic adjustment circuit adjusts a cyclic nature of a transmission wave characteristic by adding of stress or temperature to the fiber Bragg grating.

18. An apparatus comprising:
a demultiplexer to demultiplex a wavelength division multiplexed signal light into a plurality of wavelength channel signal lights included in the wavelength division multiplexed signal light, and thereby output the plurality of wavelength channel signal lights; and
a plurality of optical receivers corresponding, respectively, to the plurality of wavelength channel signal lights output by the demultiplexer, each optical receiver to receive the corresponding wavelength channel signal light and including:
an optical amplifier to amplify the corresponding wavelength channel signal light;
a cyclic filter having a transmission wavelength characteristic in which transmittance is cyclically changed to correspond with a channel distance of the wavelength channel signal lights in the wavelength division multiplexed signal light the cyclic filter passing the corresponding wavelength channel signal light amplified by the optical amplifier; and
a demodulator operably connected to the cyclic filter to demodulate the wavelength channel signal light output from the cyclic filter into an electrical signal.

\* \* \* \* \*

UNITED STATES PATENT AND TRADEMARK OFFICE
CERTIFICATE OF CORRECTION

PATENT NO. : 8,452,193 B2
APPLICATION NO. : 12/640381
DATED : May 28, 2013
INVENTOR(S) : Miki Onaka It is certified that error appears in the above-identified patent and that said Letters Patent is hereby corrected as shown below:

In the Claims:

Column 17, Line 39, In Claim 12, after "of" insert -- a --, therefor.

Column 18, Line 7, In Claim 14, delete "into" and insert -- to --, therefor.

Column 18, Line 42, In Claim 18, delete "light" and insert -- light, --, therefor.

Signed and Sealed this
Twenty-fourth Day of September, 2013

Teresa Stanek Rea
*Deputy Director of the United States Patent and Trademark Office*